United States Patent [19]

Sullivan et al.

[11] Patent Number: 6,105,028
[45] Date of Patent: *Aug. 15, 2000

[54] METHOD AND APPARATUS FOR ACCESSING COPIES OF DOCUMENTS USING A WEB BROWSER REQUEST INTERCEPTOR

[75] Inventors: David J. Sullivan, Nashua, N.H.; William Joseph Gauvin, Leominster; Edward James Taranto, Boston, both of Mass.

[73] Assignee: Digital Equipment Corporation, Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,882

[22] Filed: Jun. 26, 1997

[51] Int. Cl.[7] ....................................................... G06F 17/30
[52] U.S. Cl. ............................ 707/10; 707/501; 707/513; 707/104; 709/203; 709/217; 709/218; 711/126
[58] Field of Search .............................. 707/10, 501, 513, 707/104; 395/200.48, 200.47, 200.57, 200.3, 200.32, 200.49, 200.54, 200.33; 709/201, 203, 217, 218, 219; 711/126

[56] References Cited

U.S. PATENT DOCUMENTS

| | | |
|---|---|---|
| 5,721,851 | 2/1998 | Cline et al. . |
| 5,732,219 | 3/1998 | Blumer et al. . |
| 5,737,619 | 4/1998 | Judson ..................................... 707/500 |
| 5,754,774 | 5/1998 | Bittinger et al. .................... 395/200.33 |
| 5,764,906 | 6/1998 | Edelstein et al. ................... 395/200.49 |
| 5,774,670 | 6/1998 | Montulli . |
| 5,781,909 | 7/1998 | Logan et al. ............................. 707/200 |
| 5,784,564 | 7/1998 | Camaisa et al. .................... 395/200.54 |
| 5,826,242 | 10/1998 | Montulli . |
| 5,841,978 | 11/1998 | Rhoads . |

OTHER PUBLICATIONS

Liu, et al., "A Distributed Web Server and its Performance Analysis on Multiple Platforms", Proceedings of the 16th International Conference on Distributed Computing Systems, May 27, 1996, pp. 665–672, Hong Kong.

Morris, Mary, "HTML for Fun and Profit", SunsoftPress, pp. 91–95.

"Web Server Image Maps, Dialog Link", Technology Tutorial File 275/02015705 Dec. 1996.

"TeleWeb: Loosely Connected Access to the World Wide Web," Schilit et al., Computer Networks and ISDN Systems, vol. 28, No. 11, pp. 1431–1444, May 1996.

*Primary Examiner*—Thomas G. Black
*Assistant Examiner*—Hosain T. Alam
*Attorney, Agent, or Firm*—Williams, Morgan & Amerson, P.C.

[57] ABSTRACT

A method and apparatus for enabling access of a document on a remote network device by a local computer includes an interceptor for intercepting a request (from a web browser on the local computer system) for accessing the document. The interceptor responsively ascertains whether the local computer is connected to a network and, if connected to the network, downloads the document into memory of the local computer system. If the local computer is not connected to the network, the method and apparatus locates the document in the local memory of the local computer. Once downloaded or located, whichever the case may be, the document may be utilized by the user, such as by displaying the document on a display device.

52 Claims, 16 Drawing Sheets

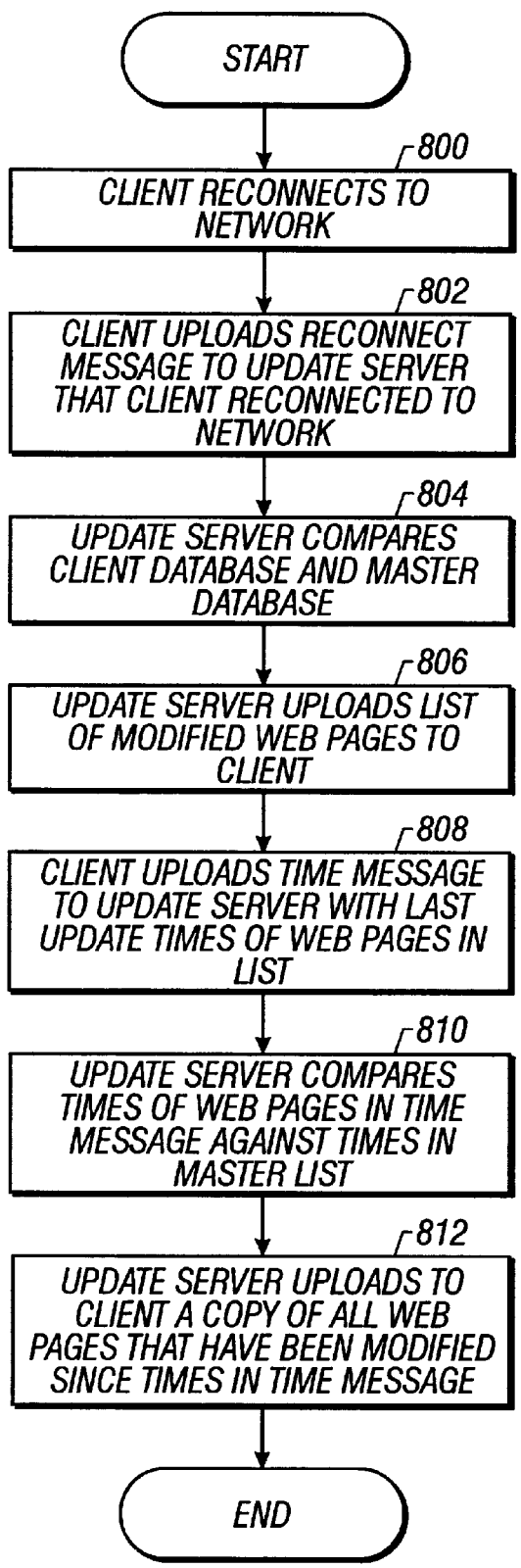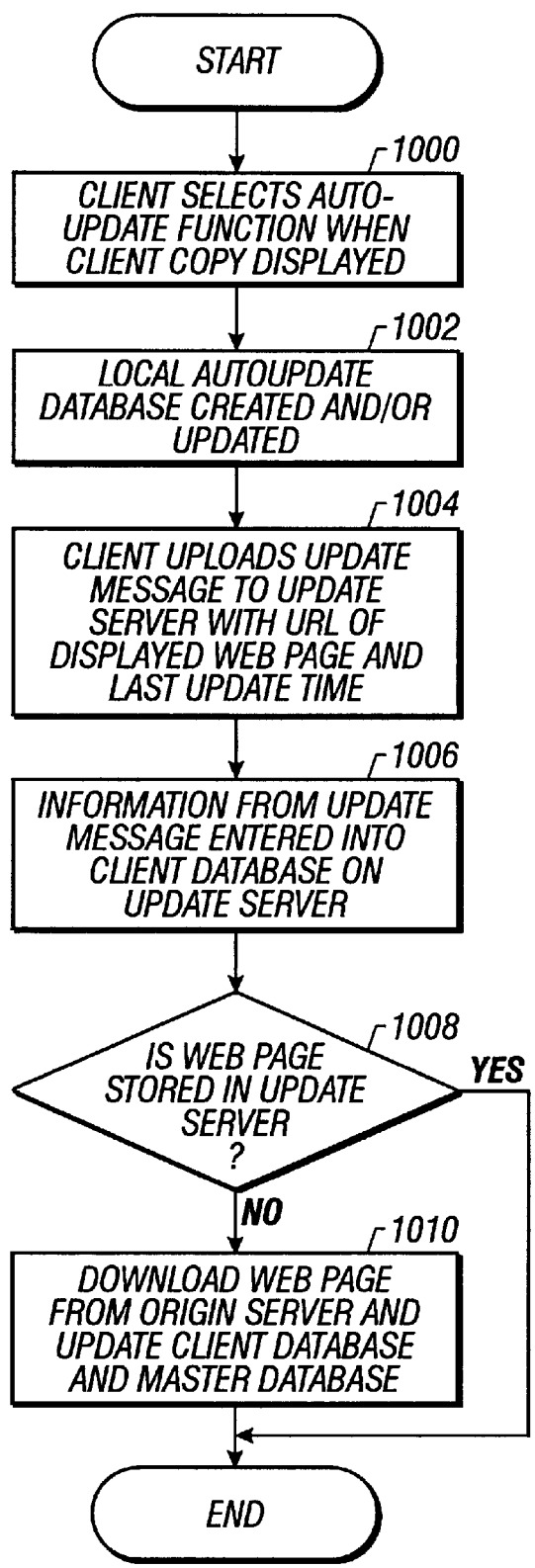
FIG. 8
FIG. 10

METHOD AND APPARATUS FOR ACCESSING COPIES OF DOCUMENTS USING A WEB BROWSER REQUEST INTERCEPTOR

FIELD OF THE INVENTION

This invention relates generally to data transmission networks and, more particularly, to disconnected access to local Internet resources.

BACKGROUND OF THE INVENTION

FIG. 1 shows a commonly used network arrangement in which a plurality of local computer systems 300 in a local area network (LAN) may access a plurality of remote servers 100 through the Internet. Each remote server 100 may include World Wide Web sites (web sites) that each include a plurality of World Wide Web pages (web pages). Each local computer system may access the remote web sites with web browser software, such as Netscape Navigator™, available from Netscape Communications Corporation of Mountain View, Calif.

The World Wide Web is a collection of servers on the Internet that utilize the Hypertext Transfer Protocol (HTTP). HTTP is a known application protocol that provides users with access to files (which can be in different formats, such as text, graphics, images, sound, and video) using a standard page description language known as Hypertext Markup Language (HTML). HTML is used to transmit data and instructions between a remote computer and a local computer in a form that is understandable to the browser software on the local computer.

Web pages accessed over the Internet, via a browser, commonly are downloaded onto the memory of the local computer system. This enables a user to quickly review web pages that were already downloaded, thereby eliminating the need to repeat the relatively slow process of traversing the Internet to access previously viewed web pages. It also enables a user to review the stored web pages when the local computer system is disconnected from the network (i.e., during disconnect). Many existing web browsers, however, cannot access the locally stored web pages during disconnect unless the user notifies the browser (via a command) that the local computer is disconnected from the network. Similarly, many other existing web browsers must be reconfigured during disconnect by the user to enable access to such stored web pages. It therefore is inconvenient for the user to access the locally stored documents via such browsers.

Accordingly, it would be desirable to have an apparatus and method that enables a web browser to more efficiently access locally stored documents that were downloaded from a network.

SUMMARY OF THE INVENTION

In accordance with one aspect of the invention, a method of accessing a downloaded document includes an interceptor for intercepting a request (from a web browser on a local computer system) for accessing the document. The interceptor responsively ascertains whether the local computer is connected to a network and, if disconnected, locates the document in the local computer system and accesses the local copy. Alternatively, if the local computer is connected to the network, the interceptor accesses either the locally stored document copy or the original document over the network. Once located, the document may be utilized by the user. For example, the document may be displayed on a display device. The interceptor thus automatically enables access to the document via the browser without requiring that the user notify the browser that the local computer is disconnected from the network.

The disclosed system enables a user to access a document via the browser without requiring that the browser be preconfigured by the user. The disclosed system thus enables the user to freely and easily access the document regardless of whether the local computer is disconnected from the network.

BRIEF DESCRIPTION OF THE DRAWINGS

The foregoing and other objects and advantages of the invention will be appreciated more fully from the following further description thereof with reference to the accompanying drawings wherein:

FIG. 8 is a flow chart illustrating a process for creating a local image map mapping table;

FIG. 10 is a flow chart illustrating a process for initiating the autoupdate process prior to disconnect;

DETAILED DESCRIPTION OF ILLUSTRATIVE EMBODIMENTS

Figure 3A:
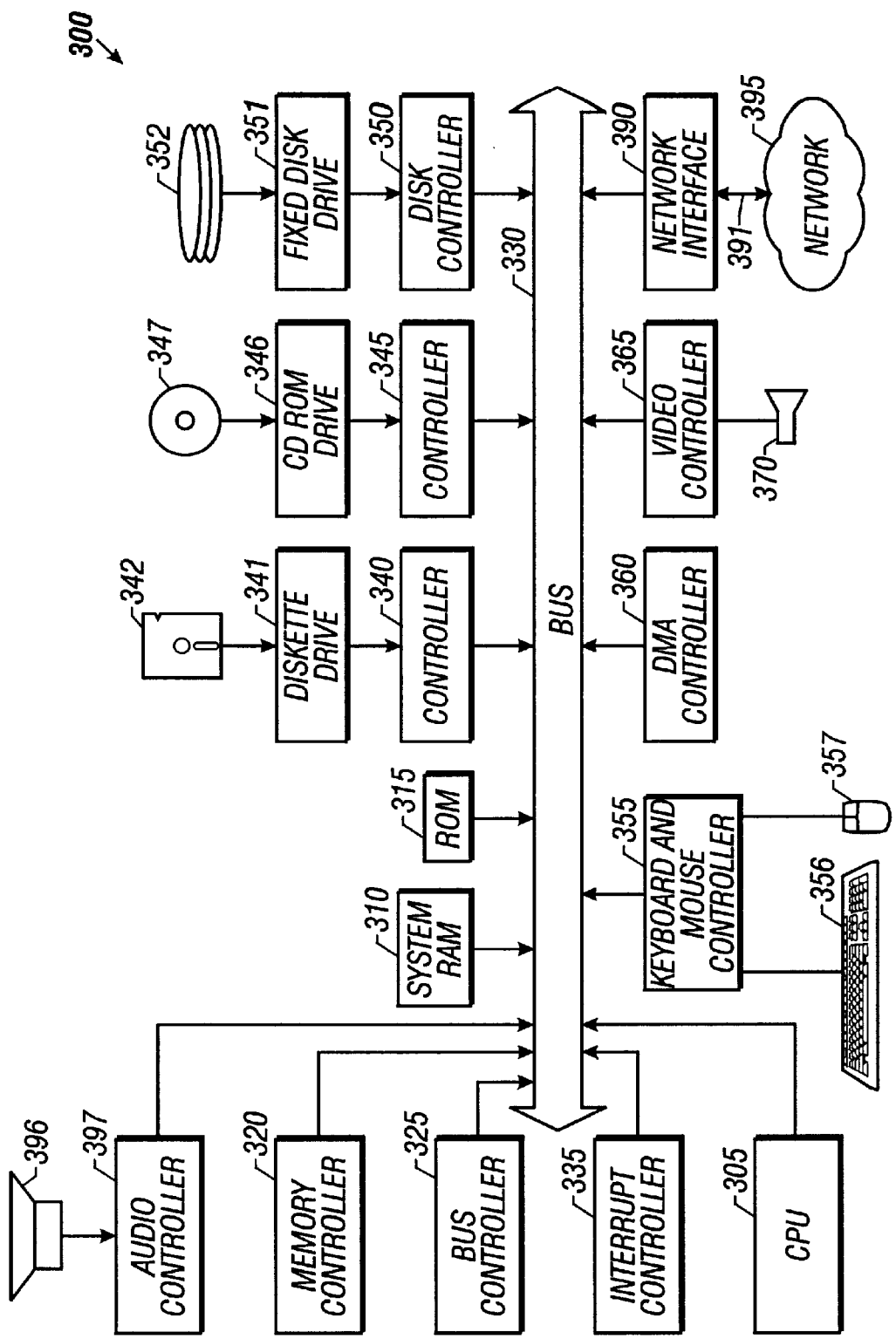
FIG. 3A is a block diagram of a client computer system suitable for use with the disclosed system.

FIG. 3A illustrates the system architecture for an exemplary client computer system 300, such as an IBM THINK- PAD 701® computer or Digital Equipment Corporation HiNote™ computer, on which the disclosed network access system (system) can be implemented. The exemplary computer system of FIG. 3A is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 3A.

The client computer 300 includes a central processing unit (CPU) 305, which may include a conventional microprocessor, random access memory (RAM) 310 for temporary storage of information, and read only memory (ROM) 315 for permanent storage of information. A memory controller 300 is provided for controlling system RAM 310. A bus controller 325 is provided for controlling bus 330, and an interrupt controller 335 is used for receiving and processing various interrupt signals from the other system components.

Mass storage may be provided by diskette 342, CD-ROM 347, or hard disk 352. Data and software may be exchanged with client computer 300 via removable media, such as diskette 342 and CD-ROM 347. Diskette 342 is insertable into diskette drive 341, which is connected to bus 330 by controller 340. Similarly, CD-ROM 347 is insertable into CD-ROM drive 346, which is connected to bus 330 by controller 345. Finally, the hard disk 352 is part of a fixed disk drive 351, which is connected to bus 330 by controller 350.

User input to the client computer 300 may be provided by a number of devices. For example, a keyboard 356 and a mouse 357 may be connected to bus 330 by keyboard and mouse controller 355. An audio transducer 396, which may act as both a microphone and a speaker, is connected to bus 330 by audio controller 397. It should be obvious to those reasonably skilled in the art that other input devices, such as a pen and/or tablet and a microphone for voice input, may be connected to client computer 300 through bus 330 and an appropriate controller. DMA controller 360 is provided for performing direct memory access to system RAM 310. A visual display is generated by a video controller 365, which controls video display 370.

Figure 1:
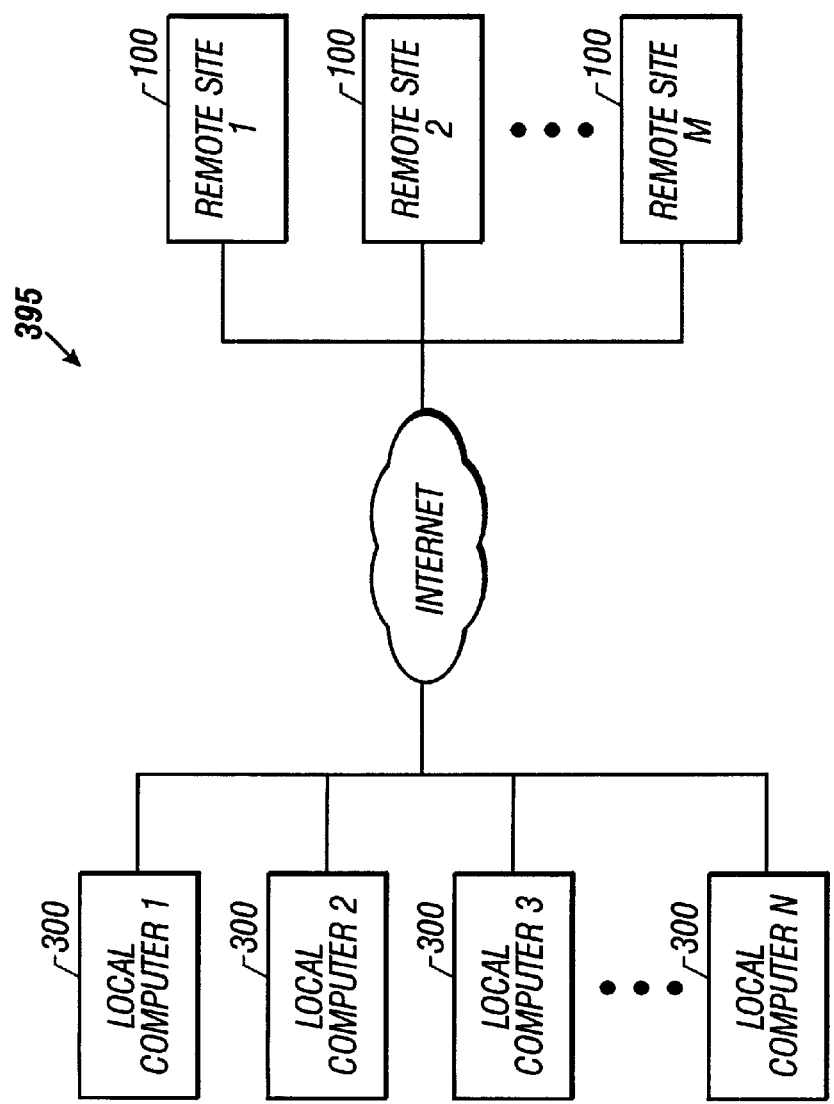
FIG. 1 is a block diagram of a generic network configuration that may be used with the disclosed system.
Figure 3C:
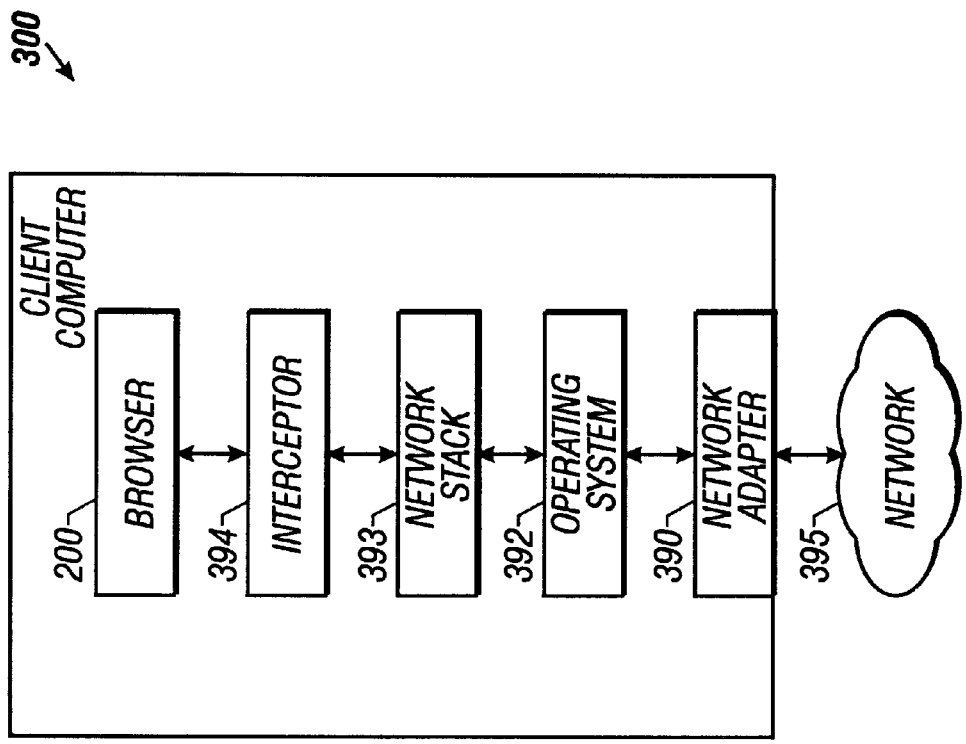
FIG. 3C is a block diagram of the client computer shown in FIG. 3B with the disclosed system.

Client computer 300 also includes a network adapter 390 that allows the client computer 300 to be interconnected to a network 395 via a bus 391. The network 395, which may be a local area network (LAN), a wide area network (WAN), or the Internet, may utilize general purpose communication lines that interconnect a plurality of network devices. FIG. 1 shows one network arrangement for use with the system in which a plurality of local computer systems (client computers 300) in a LAN are connected to the a plurality of remote network sites 100 via the Internet. The remote sites 100 may be World Wide Web sites (web sites), stored on one or more remote network devices, that each include a plurality of web pages. Each accessible web site may be accessed with web browser software 200 (FIG. 3C), such as Netscape Navigator™, available from Netscape Communications Corporation of Mountain View, Calif.

Client computer system 300 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Figure 3B:
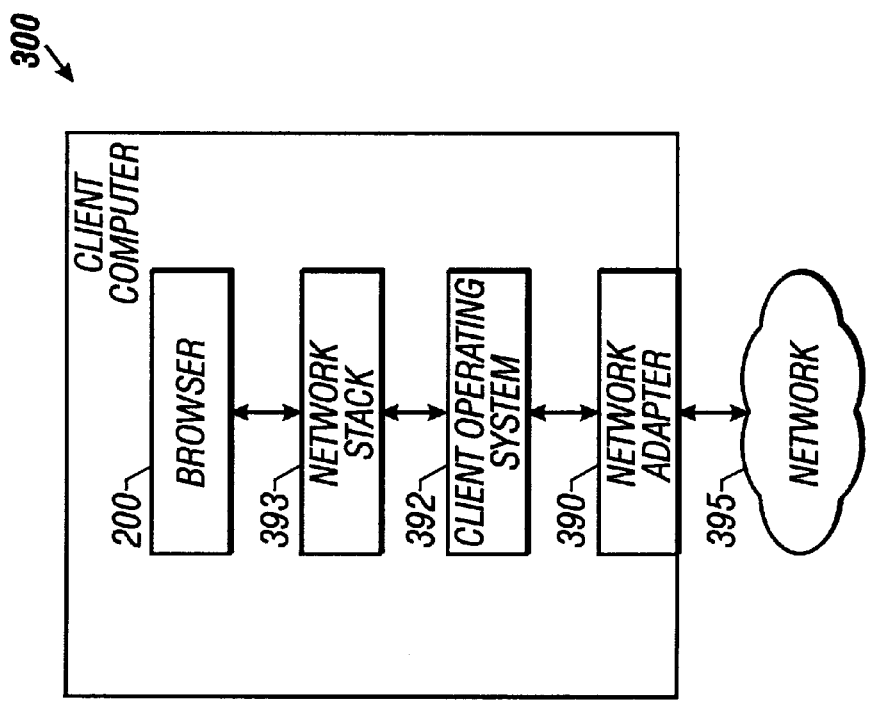
FIG. 3B is a block diagram of a prior art client computer.

FIG. 3B shows in more detail a prior art configuration of the client computer 300 connected to a network. Specifically, the client computer 300 includes the network adapter 390, the operating system 392, a network protocol stack 393 (e.g., Microsoft TCP/IP®, from Microsoft Corp.), and the browser 200. The browser 200 transmits requests to the network stack 393, which processes the requests and transmits them to the network 395 via the network adapter 390 and operating system 392. Similarly, responses from the network 395 are received by the network stack 393, via the network adapter 390 and operating system 392, and then provided to the browser 200. When downloading a remote web page from a remote server, for example, the browser 200 first transmits a request for the web page, with the web page Uniform Resource Locator ("URL"), to the network stack 393. The network stack 393 responsively locates the remote server and then transmits the request to the remote server via the operating system 392 and network adapter 390. The web page then is transmitted to the network adapter 390, via the network 395, and received by the network stack 393. The retrieved web page then is provided to the browser 200 for display on the client computer 300.

Improving on the configuration shown above in FIG. 3B, FIG. 3C shows a preferred embodiment of the system. Specifically, an interceptor 394 is added to the client computer 300 to intercept transmissions between the browser 200 and the network stack 393. Such transmissions may be a request by the browser 200 to access a web page on a remote server. Upon receipt of such transmissions, the interceptor 394 provides improved functionality for the client computer 300. Among the improvements is the capability of accessing locally stored web pages through the browser 200 without requiring that the user either preconfigure the browser 200, or notify the browser 200 that the client computer 300 is disconnected from the network 395.

The system thus includes the interceptor 394 and a mechanism for ascertaining if the client computer 300 is connected to the network 395. If the client computer 300 is connected to the network 395, the address (i.e., URL) of the web page is determined from the request. A fetch command then is transmitted to the remote server having the web page, thereby causing the client computer 300 to download the web page from the remote server. Conversely, if the client computer 300 is not connected to the network 395, the system includes a mechanism for locating the web page in the memory of the client computer 300 if such web page had already been downloaded. The downloaded web page preferably is stored in a local directory structure constructed as discussed below with reference to FIGS. 7C, 7D, and 7E.

Use of the interceptor 394 thus enables the user to access a web page via the browser 200, during disconnect, in a manner similar to that when the client computer 300 is connected to the network 395. The user thus may access the downloaded web page without knowing if the client computer 300 is connected to or disconnected from the network 395.

Figure 4:
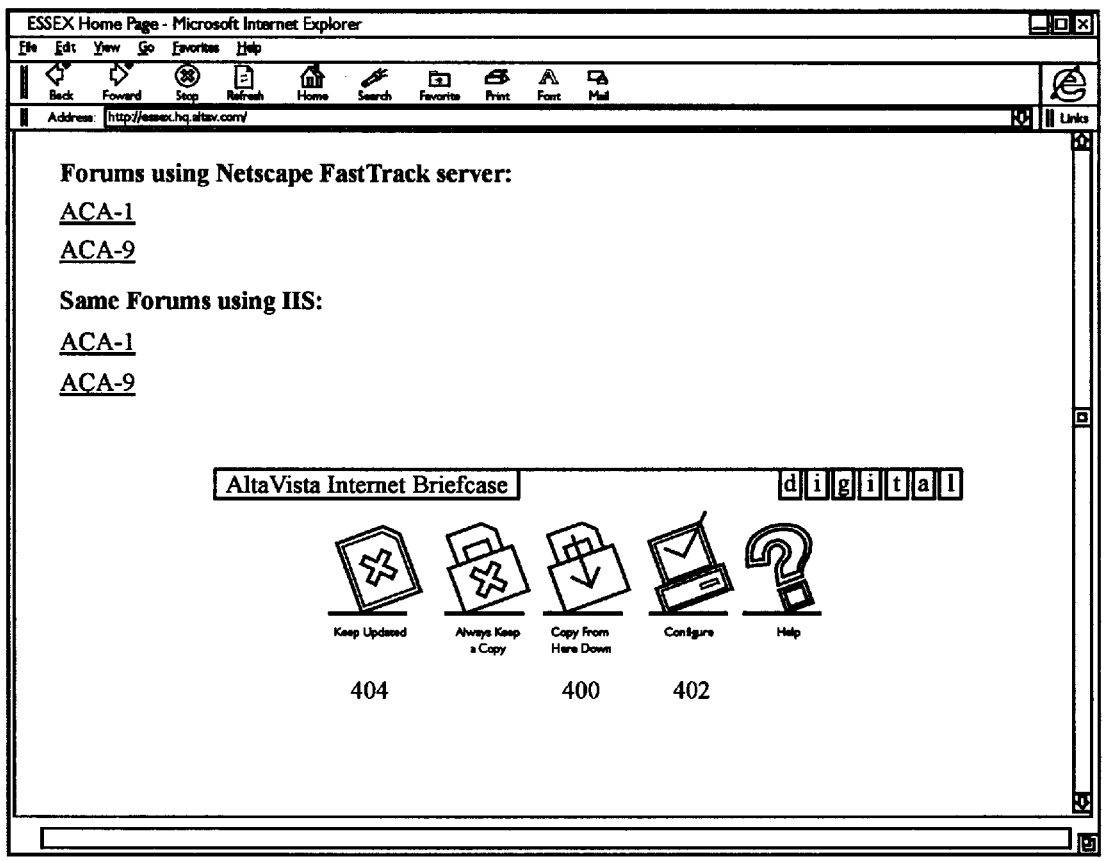
FIG. 4 is an illustration showing the graphical user interface used to initiate the disclosed system.

In accordance with another aspect of the system, referred to as "cache from here down" (CFHD), a set of preselected web pages from a single remote web site may be downloaded into the non-volatile memory of the client computer 300 for subsequent review when the client computer 300 is disconnected from the network 395. More particularly, when the CFHD process is initiated, a web page displayed by the client computer 300, specified web pages in the same node (i.e., containers that contain web pages) as the displayed web page, and specified web pages in the same branch on nodes below the displayed web page, are automatically downloaded into the non-volatile memory of the client computer 300. The entire web site thus is not downloaded, thereby saving download time and memory on the client computer 300. To that end, indicia may be included on the displayed web page that enables a user to select the CFHD function. FIG. 4, for example, shows such indicia as being a button 400 having the text string, "cache from here down." Selection of this button 400 causes the client computer 300 to execute the CFHD process in the background. Since it is a background process, the entire CFHD process is completed without interrupting the normal execution of the web browser 200. A user therefore may continue browsing any remote site while the selected web pages are being downloaded.

Figure 5:
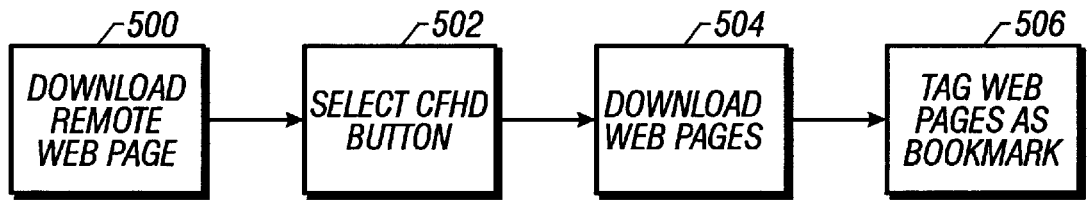
FIG. 5 is a flow chart illustrating a process for downloading selected web pages onto the client computer.

FIG. 5 is a flow chart illustrating a process that may be used for downloading the web pages into the non-volatile memory of the client computer 300 from a remote web site. At step 500, a user accesses and downloads a remote web page. In the preferred embodiment, such a remote web page is automatically stored in the non-volatile memory of the client computer 300. The CFHD button 400 then is selected at step 502 to initiate the CFHD background process. This causes the browser 200 to transmit a request to the interceptor 394, which performs the remaining steps of the process (see FIGS. 6–7D). Copies of the selected web page (i.e., the root web page), certain web pages in the same node as the selected web page, and certain web pages in the same branch on nodes within a preselected number of levels below the selected web page node, then are downloaded into the non-volatile memory of the client computer 300 at step 504. The inventive process creates a local directory structure (discussed below) in the client computer 300 for efficiently filing the downloaded web pages. At step 506, the downloaded web pages may be tagged as a bookmark in the web browser 200 for future access. The downloaded web pages thus may be accessible for display, or other use by selecting either a bookmark or an "open" button in the browser.

In addition to downloading certain web pages between the root node and a preselected number of levels below the root node, the system also may be configured to download, in preselected instances, web pages on servers that are remote from the server having the root web page. The details of downloading such web pages are discussed in greater detail below with reference to FIGS. 6 through 7D.

Although the system preferably is implemented with default values for all of the parameters necessary for practicing the system, the preselected maximum number of levels below the selected web page may be chosen before the CFHD button 400 is selected. Accordingly, a configure button 402 may be included that enables a user to preselect the maximum number of levels to download onto the client computer 300 from the web site. In addition, the configure button 402 also may include a number of other "filtering" parameters that prevent the computer from downloading and storing certain web pages from the web site (i.e., "filtering" the web pages). One such filtering parameter, for example, may enable the client computer 300 to store only web pages that are less than a preselected size. Web pages that are greater than the preselected size thus are not stored. Another filtering parameter may prevent the client computer 300 from storing web pages resident on network devices that are remote from the network device on which the selected web page is located. Such filtering parameter thus ensures that each of the stored web pages originates from the same remote network device. Yet another filtering parameter may prevent the client computer 300 from storing web pages that are not a preselected type. A type of file is identified by an extension at the end of a URL. For example, no graphic image files (having the extension ".gif") will be stored if such files are selected to be filtered. Similarly, the filtering parameters may be selected to filter out portions of web pages that are in a preselected format. For example, only the text in HTML (Hypertext Markup Language) web pages having both text and references to graphic image files (GIF files having the suffix ".gif") may be downloaded onto the local computer. It should be noted, however, that any combination of the above noted filtering parameters may be selected.

Figure 6:
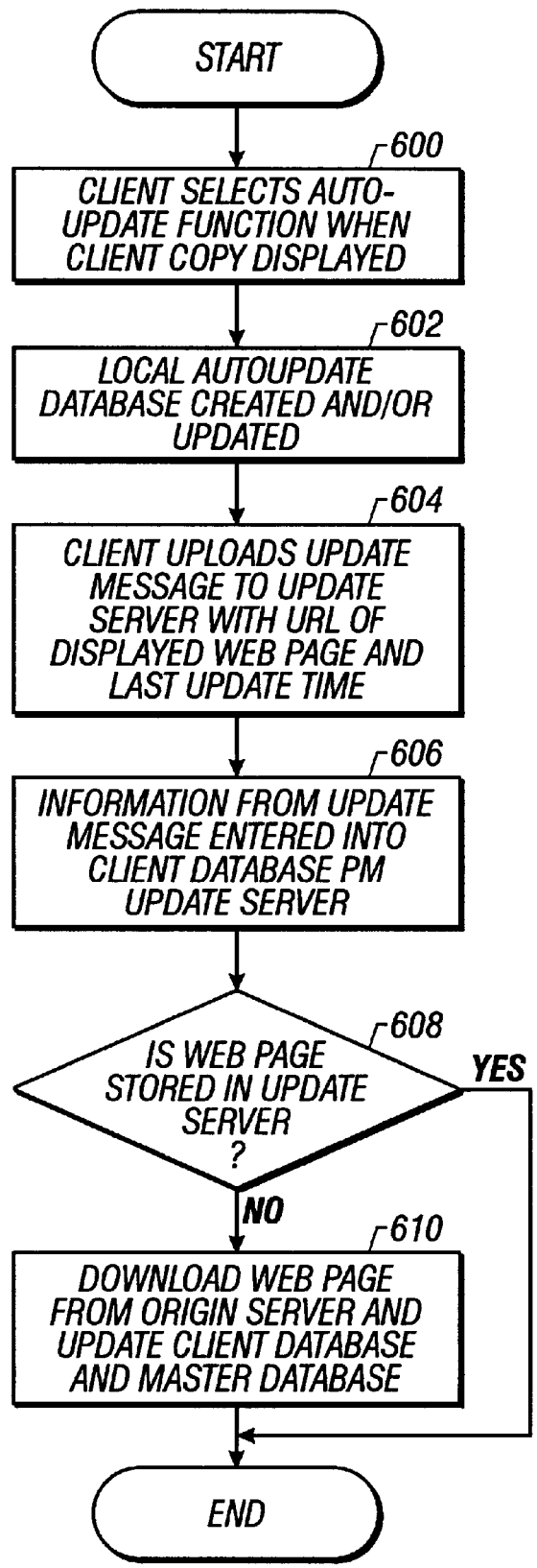
FIG. 6 is a flow chart illustrating a process of filtering web pages in the CFHD system.

FIG. 6 is a flow chart illustrating a process that may be used by to filter the web pages. This process utilizes the URL of the web page being filtered to ascertain the necessary information for processing the web page. Specifically, at step 600, it is determined if the web page corresponding to the URL under examination is the appropriate type of file. For example, all files except ".gif" files may be an appropriate type. The filter ascertains this by searching the URL of the examined web page for the suffix ".gif", for example, to determine if such web page is such a file. If not the appropriate type, the web page does not pass through. If it is the appropriate type, it then is determined at step 602 whether the web page is on the same server as the root web page. The filter ascertains this from the URL of the examined web page by comparing its web site designation to that of the root web page. If the URL indicates that the web page under examination is not on the same server, then it is determined at step 604 whether the filtering parameters were configured to permit a download from a different remote server device than the server device of the root page. If not, then the web page does not pass through the filter. If web pages from remote servers are allowed, then the web page successfully passes through the filter.

Returning to step 602, if the web page under examination is on the same server device as the root web page, it then is determined at step 606' if the examined web page is on the same level or within a preselected number of levels below that of the first page. This is ascertained by counting the number of forward slashes (i.e., "/") in the URL. If not on the same level or within a preselected number of levels, the web page does not pass through the filter. Otherwise, the web page successfully passes through the filter.

By way of example, a root web page having the URL, "www.altavista.com/creative/index.htm", for example, has all of the necessary information for the above noted filter. The type of file is a ".htm" file, the remote server is "www.altavista.com", and the levels from the root web page may be ascertained by counting the "/" between the node "creative" and the node of the current web page. Continuing with the previous example, since there is no ".gif" suffix in the URL, this web page will pass through the filter.

Figure 7A:
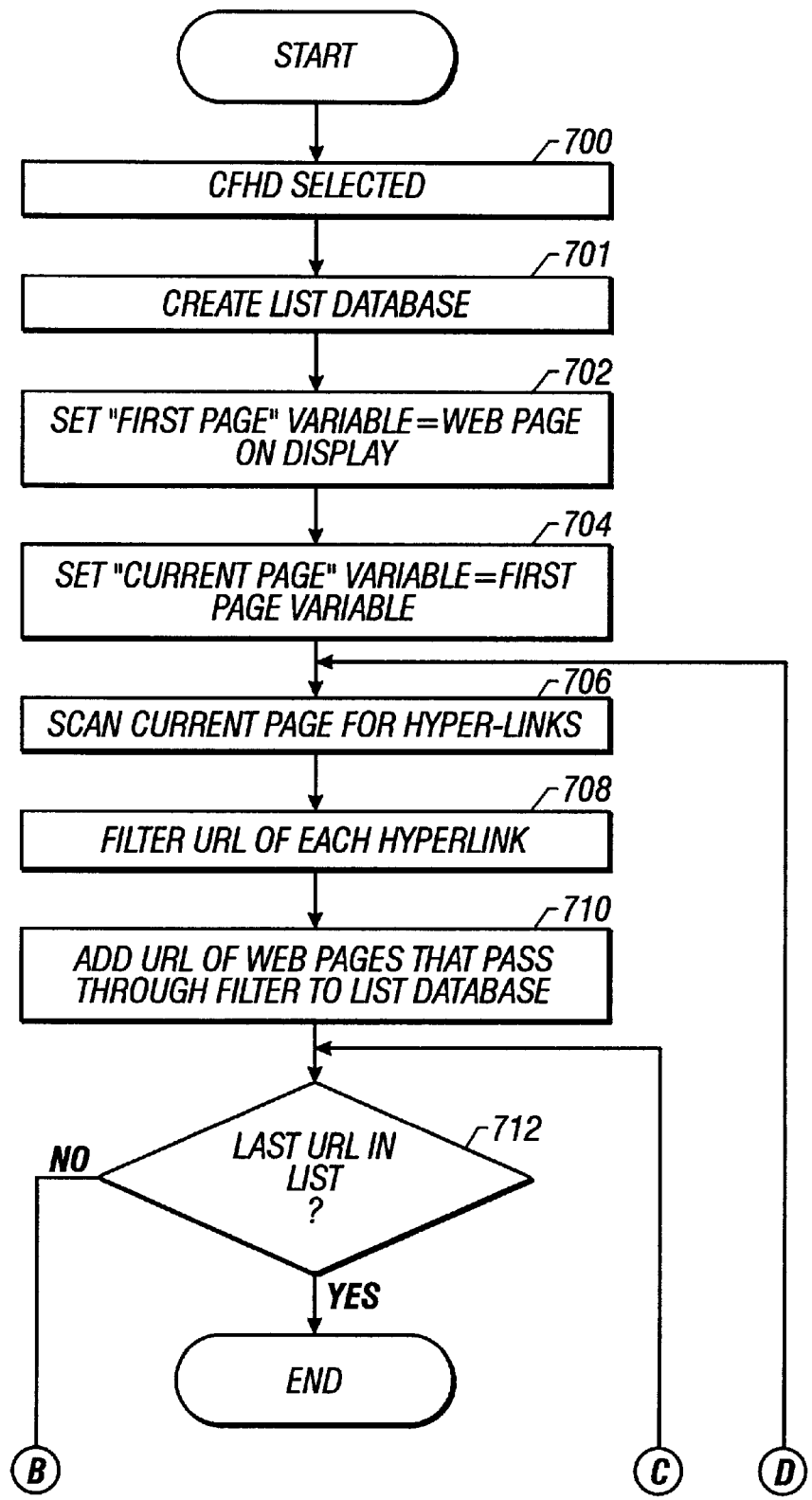
FIGS. 7A and 7B are flow charts illustrating a tree retrieval process that may be utilized with the cache from here down (CFHD) system.
Figure 7B:
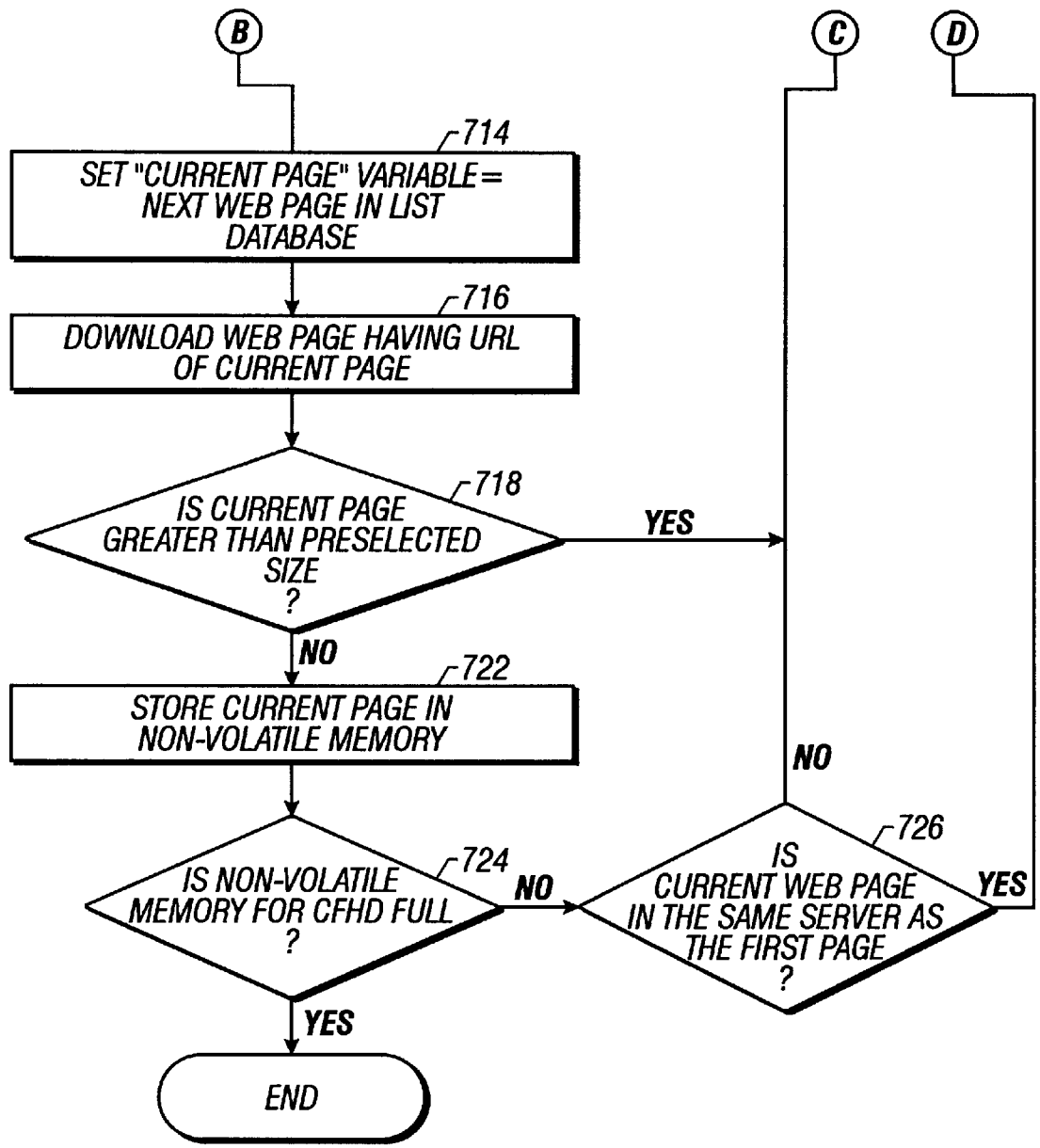

Any known process for downloading the remote web pages in the client computer 300 may be used. In the preferred embodiment, a tree retrieval process is used. This tree retrieval process stores the web pages in a local directory structure that is similar to the hierarchical tree structure on the remote network device. FIGS. 7A and 7B show one such tree retrieval process that may be used to store remote web pages in the client computer 300. Specifically, at step 700, the CFHD button 400 is selected. At step 701, a list database is created for storing the URL of each web page to download. A "first page" variable then is set to the web page displayed on the client computer 300 when the CFHD button 400 is selected (step 602). At step 704, a "current page" variable also is set to the web page displayed when the CFHD button 400 is selected. The current page then is scanned for hyperlinks at step 706. This may be done by scanning the stored HTML code for hyperlink tags. At step 708, the URL (i.e., web page) of each hyperlink is filtered according to several preselected filtering parameters (discussed below with reference to FIG. 6). The URL of web pages that pass through the filter then are added to the list database at step 710 At step 712, it then is determined if the URL of the current page is the last URL in the list database. If yes, the tree retrieval process ends.

If such URL is not the last URL in the list database, the process continues with off page connector "B" to step 714 in which the current page variable is set to the next URL in the list database. The current page then is downloaded onto the memory of the client computer 300 at step 716. It then is determined at step 718 if the current page is greater than a preselected size. If it is greater than the preselected size, the process continues with off page connector "C" and loops back to step 712 (i.e., checking for last URL in list database). This loop prevents the URLs from hyperlinks in the oversized current page from being stored in the list database, and also prevents the current page from being downloaded into the client computer system.

If the web page is not greater than the preselected size, the current page then is stored in non-volatile memory of the client computer (step 722). At step 724, it then is determined if the non-volatile memory designated for the CFHD process is full. If it is full, the process ends. If it is not full, it then is ascertained at step 726 if the current web page is in the same remote server as the first page. If it is not, then the process continues to off page connector "C" and loops back to step 712 (i.e., checking for last URL in list database). Similar to step 720, this prevents the URLs from hyperlinks in such current page from being stored in the list database. If it is in the same remote server as the first page (i.e., by comparing the current page against the first page), the process continues to off page connector "D" and loops back to step 706 (i.e., scanning for hyperlinks).

The list database may be any database that can store one or more URL strings. One such database may be a relational database having a single "URL" field identifying a URL address. Such a list database is formed and accessed by the interceptor 394 only and thus, is inaccessible to a user.

Figure 7C:
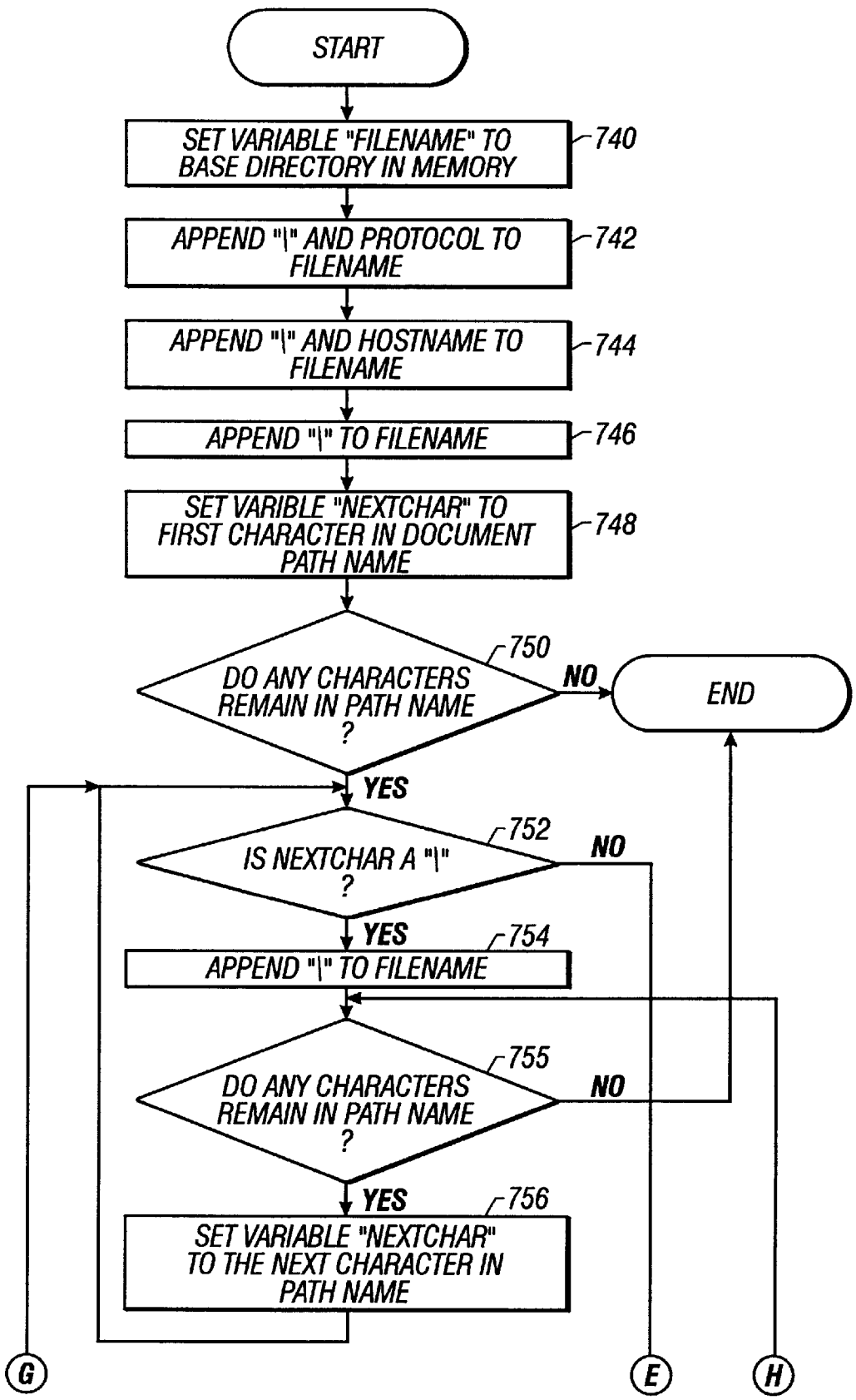
FIGS. 7C and 7D, are flow charts that collectively illustrate a process of creating a local directory structure.
Figure 7D:
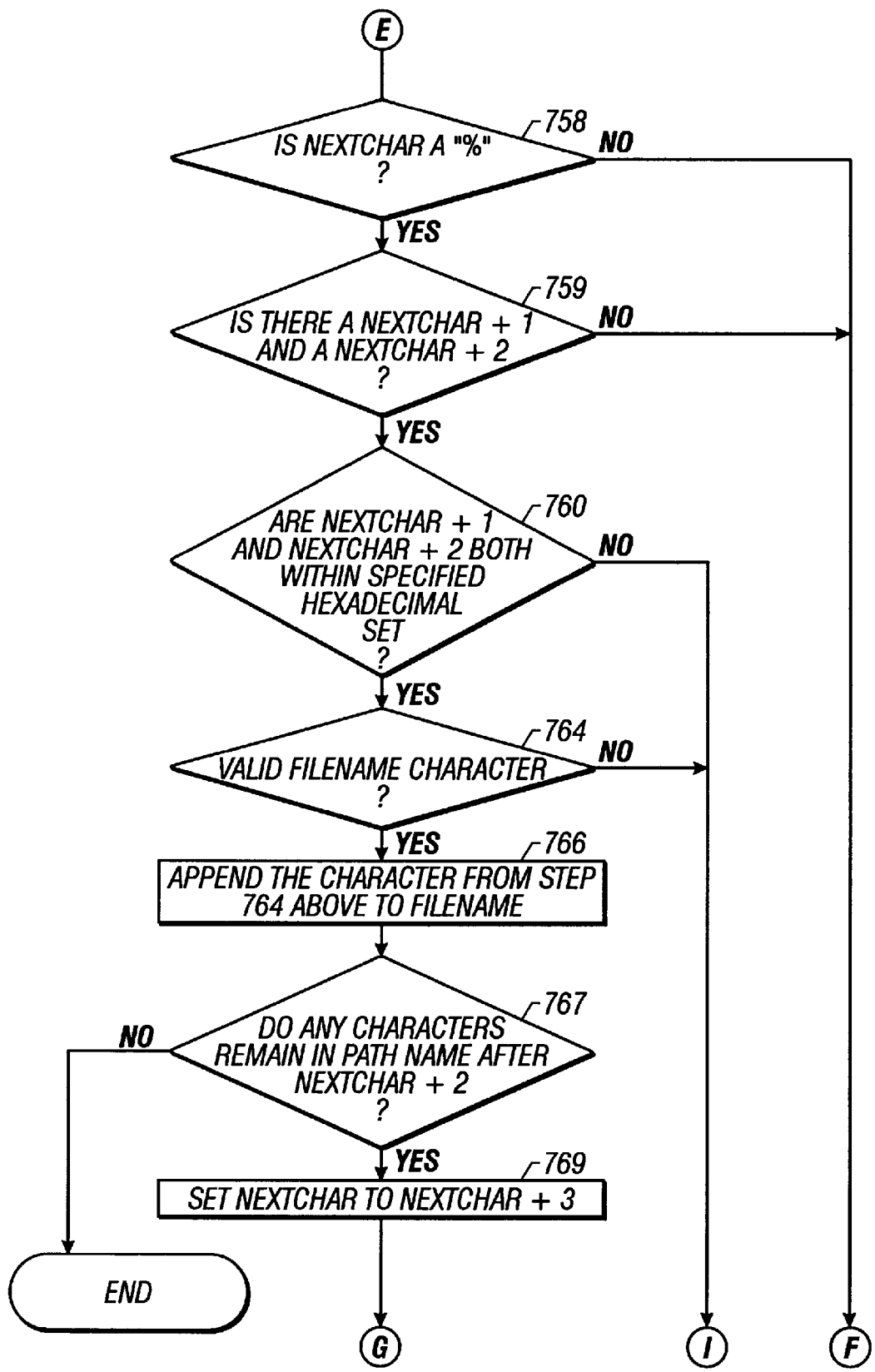

As noted above, a directory structure is created on the client computer 300 that is substantially identical to the hierarchical tree structure on the remote network device from which the stored web pages were retrieved. Any known process for creating the local directory may be used. In the preferred embodiment, a directory procedure may be used that creates a main directory and a plurality of subdirectories, identical to the remote tree structure, for the stored web pages. The directory procedure executes during the CFHD process by first reviewing the URLs of the downloaded web pages as received by the client computer 300, and then dynamically creating an appropriate local directory structure. FIGS. 7C–7E show one directory creation process that may be used to create such local directory structure.

Specifically, at step 740, a variable "filename" is set to a base directory in the memory of the client computer 300. At step 742, a "\" and then a protocol name (e.g., HTTP) is appended to filename. Similarly, at step 744, a "\" and then the host name is appended to filename. A "\" then is appended to filename at step 746. A variable "nextchar" then is set to the first character in the "document path name" (step 748). The document path name is the part of the URL that is located after the host name. At step 750, it then is determined whether any characters remain in the path name. If none remain, the process ends. If characters do remain, then it is ascertained at step 752 if nextchar is a "/." If yes, a "\" is appended to filename at step 754. It then is determined if any characters remain at step 755. If none remain, the process ends. If characters do remain, then the variable nextchar is set to the next character in the path name (step 756). The process then loops back to step 750 to ascertain if any characters remain in the path name.

Alternatively, if at step 752 nextchar is not a "\", the process continues at off-page connector "E." From off page connector "E", it then is ascertained at step 758 if nextchar is the character "%." This is important to determine because a character may be represented in ASCII form by a "%" character and two successive hexadecimal numbers. Therefore, if nextchar is not a "%", the process continues with off page connector "F." If nextchar is a "%", it then is ascertained if there is a nextchar +1 and a nextchar +2 (step 759). If such characters do not exist, the process continues to off page connector "F." If such characters do exist, it then is ascertained at step 760 if nextchar +1 and nextchar +2 are both within the hexadecimal set [0–9, lower case a–f, and A–F]. If not, the process continues to step 772 via off page connector "I.". If yes, it then is ascertained at step 764 if, when treating nextchar +1 followed by nextchar +2 as a two-digit hexadecimal number, the character whose ASCII value equals such number is a valid file name character. If not a valid file name character, the process continues to step 772 via off page connector "I." If a valid file name character, the character from step 764 above is appended to filename (step 766). It then is determined if any characters remain in the path name (step 767) after nextchar +2. If none remain, the process ends. If characters do remain, then nextchar is set to nextchar +3 (step 769). The process then loops back to step 752, via off page connector "G", to ascertain if nextchar is a "/."

If, in step 758, a determination is made that nextchar is not a "%" character, it then is ascertained at step 768 if nextchar is a valid file name character. If not, then using the ASCII value of nextchar, a "%" followed by the two digit hexadecimal value is appended to filename at step 770. The process then loops back to step 756 to set nextchar to the next character in the path name. If at step 768 the result is positive, the process continues to step 772 where nextchar is appended to filename. The process then loops to step 756 via off page connector "H.".

Using the above directory creating process, an exemplary URL "http://etpc.hq.altav.com/root/look at this.html" is converted to a directory structure with a root directory of "cachebase" as follows:

"cachebase\http\etpc.hq.altav.com\root\look%20at%20 this.html".

Locally stored web pages may be accessed through a browser by conventional means, such as by selecting an "open" button, or by selecting a bookmark. Selection of a bookmark causes the computer to display the first web page (i.e., the root web page in the tree) on the display 370. A user may traverse through a stored directory structure in the same manner that such user would traverse through the analogous tree structure on the remote network device from which the stored web pages originated. In the event that a web page is selected that was not stored on the local computer (such as a web page at a higher level than the first web page), the client computer 300 will display indicia indicating that the selected web page is not stored locally. For example, the client computer 300 may display the text "the selected web page is not stored in local memory" when a web page that was not stored on the client computer 300 is selected. When viewing a stored web page, additional indicia may be displayed indicating that the viewed web pages were retrieved from the memory in the client 10 computer 300 and not from the remote network site. Since the interceptor 394 intercepts browser requests to display web pages and automatically selects an appropriate source for the pages, the retrieved web pages may be viewed either when the client computer 300 is disconnected from or connected to the network 395.

As a supplement to the CFHD function, a mechanism may be included to download into non-volatile memory each web page from the remote web site that was accessed by the browser 200 en route to the root web page. For example, a user may have traversed two web pages to get to a selected root web page. Accordingly, the two accessed, higher level web pages are downloaded into the client computer memory, in addition to the web pages saved by selecting the CFHD button 400.

The system also can maintain the function of pointers (i.e., hyperlinks) that are a part of web pages downloaded in the client computer 300 from the remote web site. More particularly, when the computer system 300 is disconnected from the network 395, this aspect of the system enables a user to move between downloaded web pages by selecting hyperlinks on image map files that are a part of displayed web pages. To that end, a local graphical image mapping table preferably is created in the client computer 300. The mapping table associates (i.e., maps) one or more sections of a graphical image produced by an image map file (on a downloaded web page) with one or more locally stored web pages. The local image mapping table may be a relational database having the fields, "coordinates on image map" and "local URL." During disconnect, a selection of any part of the graphical image causes the client computer 300 to access the local image mapping table. This enables the client computer 300 to locate and display the web page associated with the selected part of the graphical image.

A process for creating the local image mapping table is shown in FIG. 8. This process may be initiated by the interceptor 394 either while browsing remote network sites, or when the CFHD button 400 is selected. Similar to the CFHD process, the preferred process of creating the local image mapping table is a background process and thus, does not interrupt the normal execution of the browser 200 or other applications on the system.

The preferred process for creating the local image mapping table begins at step 800 by ascertaining whether the HTML code of a downloaded web page includes an image map file. This may be done by scanning for an ISMAP tag in the HTML code. The process ends if the web page does not include such a file. If the web page does include an image map file, the graphical image displayed by the image map file then is divided into a predetermined number of sections at step 802. The sections preferably are square in shape and should collectively encompass the entire graphical image of the image map file. Although there preferably is a default number of sections, the user may preset either the number of sections or the size of the sections by means of the configure button 402. The variable "current section" then is set at step 804 to the first section of the graphical image. The center point of the current section then is examined (by the background process) at step 806. Although the center point preferably is selected, any other point in the sections could be examined to create the local image mapping table.

The client computer 300 then sends a query request, to the remote network device, that includes the selected coordinates of the graphical image (step 808). In response to this query request, the remote network device uploads, to the client computer 300, the web page (i.e., a response) associated with the selected point. The client computer 300 then stores the URL of the downloaded web page and the coordinates of the current section of the graphical image in the local image mapping table (step 808). It then is ascertained at step 810 if the last section has been reached. If it has been reached, the process ends and the local mapping table is fully formed. If the last section has not been reached, then the current section variable is set to the next section in step 812. The process then loops back to step 806 to select the center point of the current section.

Accordingly, a user's selection of any point of a graphical image produced by an image map file on a displayed web page causes the interceptor 394 to ascertain if the client computer 300 is connected to the network 395. If the client computer 300 is not connected to the network, the interceptor 394 causes the client computer 300 to access the local image mapping table to ascertain if there is a stored web page associated with the section of the graphical image that was selected. If there is a stored web page associated with such section, its URL in the mapping table is used to fetch such web page from the local directory structure for display on the display 370.

In accordance with another aspect of the system, a mechanism also may be included for automatically updating a downloaded copy of a remote document (e.g., a web page from an origin web site), stored on a disconnected client computer 300, when such client computer 300 reconnects to the network 395. This update captures any modifications made to the web page at the origin web site while the client computer 300 was not connected to the network 395 (i.e., during disconnect). This aspect of the system (referred to herein as "autoupdate") updates the downloaded web page copy with a minimum of client computer processor usage, thereby maximizing the speed and efficiency of the client computer 300 during the update process.

Figure 9:
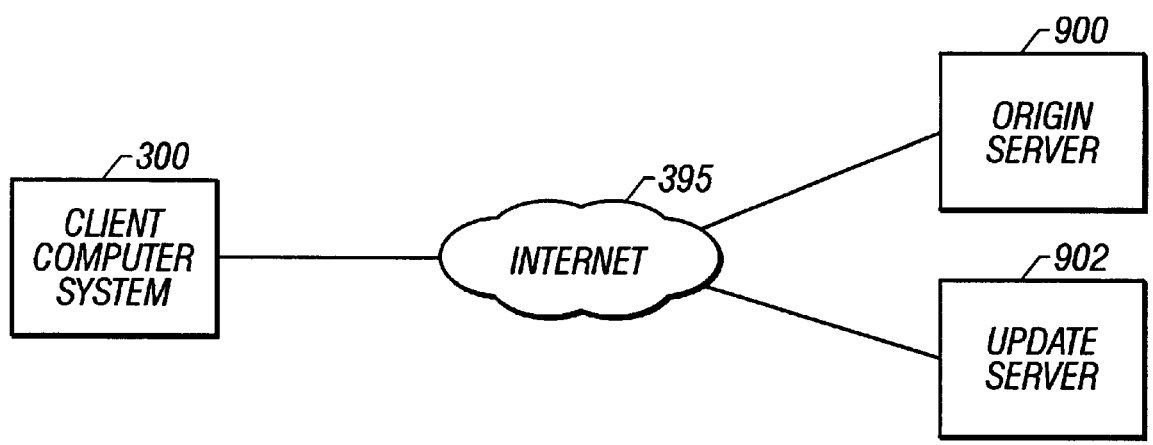
FIG. 9 is an exemplary network configuration that may be used with the autoupdate system.

FIG. 9 shows an exemplary network configuration that includes the autoupdate system. The network 395 includes a plurality of network devices that may be interconnected by the Internet. The network devices include an origin network device 900 ("origin server 900") having the web site with a web page, the client computer 300 for accessing the origin server 900 and displaying a web page retrieved from the origin server 900, and an update network device ("update server 902"). The update server 902, which may service many client computers as described below, may be a general purpose computer having software for implementing the autoupdate function.

The autoupdate function, which in the preferred embodiment is a background process, may be initiated when the downloaded web page (client copy) is displayed on the client computer 300. When initiated, a copy of the web page (update copy) is uploaded into the memory of the update server 902 from the origin server 900. When the client computer 300 subsequently disconnects from the network 395, the update server 902 periodically accesses the origin server 900 to ascertain if the web page is different than the update copy. As discussed in greater detail below, this may be done by comparing the last update time of the update copy with the last update time of the web page on the origin server 900. If the web page is different, the update copy is modified to reflect the differences. This may be done by directly overwriting the update copy with a copy of the (modified) web page.

When the client computer 300 reconnects to the network 395, it automatically re-accesses the update server 902. If the client copy is different than the update copy at such time, the client copy is modified to reflect the differences. This too may be done by directly overwriting the client copy with a copy of the update copy. In the preferred embodiment, the autoupdate process repeats each time that the client computer 300 disconnects from and reconnects to the network 395. The autoupdate process preferably continues until the client copy of the web page is deleted from the memory of the client computer 300. Alternatively, the autoupdate function may be turned off by accessing a control panel via the configure button 402. The details of one method for implementing this process are discussed below. As shown below, the autoupdate efficiently updates the client copy by utilizing the processor time of the update server 902 instead of the processor time of the client computer 300.

Specifically, FIG. 10 is a flow chart illustrating a process for initiating the autoupdate process prior to the time that the client computer 300 disconnects from the network 395. The process begins at step 1000 where the autoupdate function is initiated (by the user) while the client copy is displayed on the client computer 300. Illustratively, the process may be initiated by means of a graphical user interface displaying an "autoupdate" button 404 at the bottom of the displayed client copy. After the autoupdate button 404 is selected, the client 300 creates and/or updates a local "autoupdate" database having the fields "URL" and "last update" (step 1002). The URL of the client copy is entered under the "URL" field, and the date and time of the last update of the client copy correspondingly is entered under the "last update" field. The client then uploads an update message to the update server 902 specifying the URL of the selected web page and the last update time of such URL on the client 300 (step 1004).

At step 1006, in response to the update message, the update server 902 modifies a "client" database that is stored on the update server 902. The client database maintains a listing of the web pages being maintained by the update server 902 for each client computer 300, and the last update time of each of the client copies of such web pages. The client database therefore has the fields "client", "web page (s)" and "last update time and date of client copy of the web page." Accordingly, the information from the update message is entered into the appropriate fields in the client database. For example, if the update server 902 is maintaining two web pages for the client computer 300, the client database will have two records for the client 300. Each of the two records therefore will specify the client 300, the URL of the web page being maintained, and the last update time of the client copy for the maintained web page.

At step 1008, it then is ascertained if the selected web page already is stored in the update server 902. If yes, the autoupdate initiation process ends. If no, the update server 902 first downloads the web page from the origin server 900 (creating the update copy), and then modifies a "master" database stored on the update server 902 (step 1010). The master database, which maintains a listing of the last update time of each stored update copy on the update server 902, includes fields "URL" and "last update." Accordingly, the URL of the web page is entered under the "URL" field, and the date and time of the last update of the update copy is entered under the "last update" field.

Figure 11:
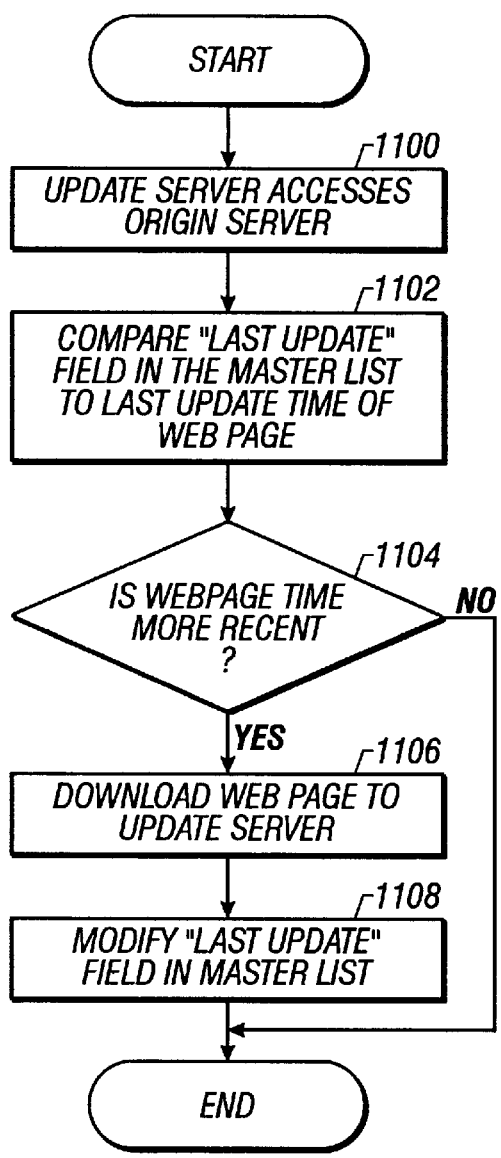
FIG. 11 is a flow chart illustrating a process for updating an update copy during disconnect.

FIG. 11 is a flow chart illustrating a process for maintaining the update copy while the client computer 300 is disconnected from the network 395. Specifically, the update server 902 first accesses the origin server 900 (step 1100) and then compares the "last update" field in the master list with the last update time of the web page (step 1102) on the origin server 900. The last update time of the web page may be accessed by conventional means. For example, the update server 902 may transmit a message to the origin server 900 requesting a copy of the web page. In response, the origin server 900 may transmit such copy to the update server 902 with a header having the last update time of the web page. At step 1104, it then is ascertained if the compared times are different. If the times are not different, the process ends. If different and the last update time of the web page on the origin device is more recent than the last update time of the update copy, the process proceeds to step 1106 where a copy of the web page (which has been modified since the previous download onto the update server 902) is downloaded to the update server 902. As noted above, this may be done by overwriting the update copy with the updated web page. After the updated web page is downloaded onto the update server 902, the "last update" field of the master database table is updated for such web page to reflect the recent update (step 1108). This process may repeat periodically until the client computer 300 reconnects to the Internet.

Figure 12:
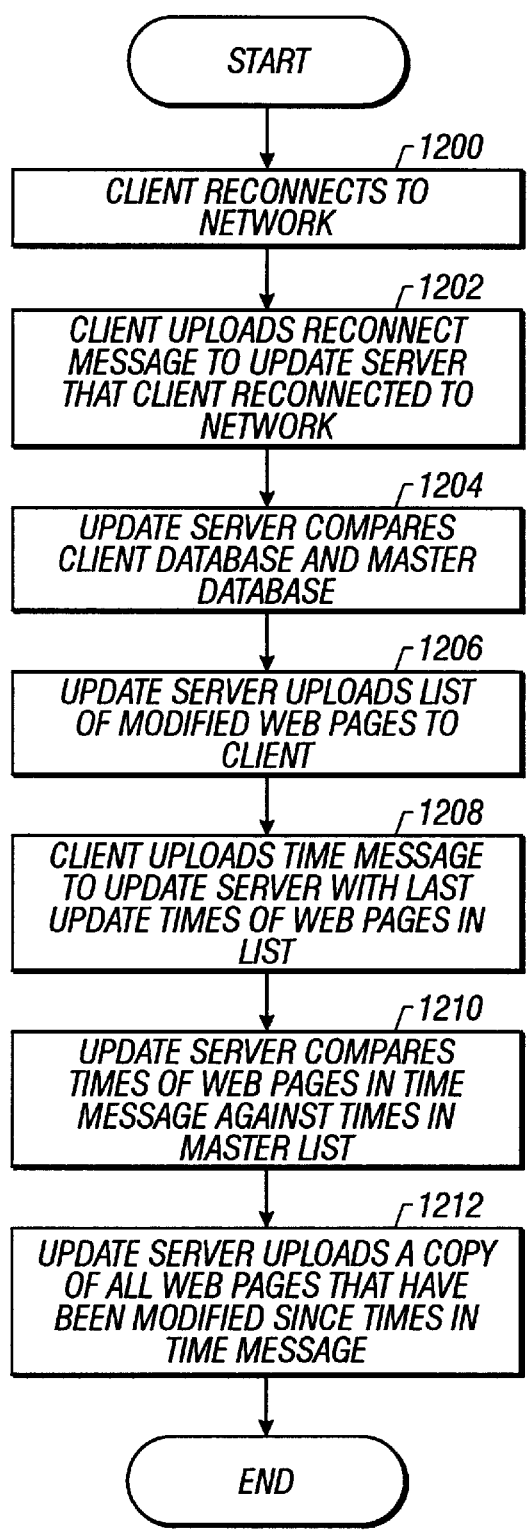
FIG. 12 is a flow chart illustrating a process for updating a client copy after reconnect.

FIG. 12 is a flow chart illustrating a process for updating the client copy when the client computer 300 reconnects to the network 395 (step 1200). At step 1202, the client computer 300 uploads a reconnect message to the update server 902 notifying the update server 902 that the client 300 is reconnected to the network. The update server 902 accesses its internal client database and master database to determine if any of the client copies must be modified (step 1204). This is accomplished by comparing the times of the client copies in the update server client database against the times in the master database. The update server 902 then uploads to the client a list of each client copy that requires modification (step 1206).

At step 1208, the client responsively uploads a time message to the update server 902 with the last update times of the client copies in the list. These times are retrieved from the local autoupdate database. The update server 902 then compares the times received in the time message against the times in the master database (step 1210). At step 1212, the update server 902 uploads to the client 300 a copy of all web pages that have been modified since the times in the time message. These web pages are determined by comparing the times received in the time messages to the times stored in the master database.

The above process therefore enables the autoupdate process to be used even when a client computer 300 manually updates the client copy via a network that is not accessible to the update server 902. Specifically, after the client copy is manually updated, the "last update" field in the local autoupdate database consequently is modified to reflect the time of such update. In the event that such time is more recent than the time of the update copy during the comparison in step 1210, the process ends, thereby maintaining the manually updated copy of the web page as the most recent client copy of the web page. The update server 502 may then modify the update copy.

As previously noted, the update server 902 may periodically access the origin server 900 to update the update copy of the web page. The accessing time period may be configured prior to selection of the autoupdate button 404 by selecting the configure button 402 (FIG. 4). Such time period may be selected based upon the nature of the information contained in the web page. For example, if the web page includes up to the minute stock quotes, it would be desirable to select the time period to be relatively short, such as every ten minutes. Conversely, if the web page includes information relating to scores for weekly football games, it would be desirable to select the time periods to be every seven days.

In an alternative embodiment, the autoupdate process may be used even when a remote web page is not initially stored on the client computer 300. Specifically, when the client computer 300 accesses the web page at the web site, the autoupdate process is initiated. Upon initiation, the process first downloads the selected web page to the client computer 300, and then continues the preferred embodiment of the process as if the downloaded web page was originally stored on the client when the process was initiated.

Figure 13:
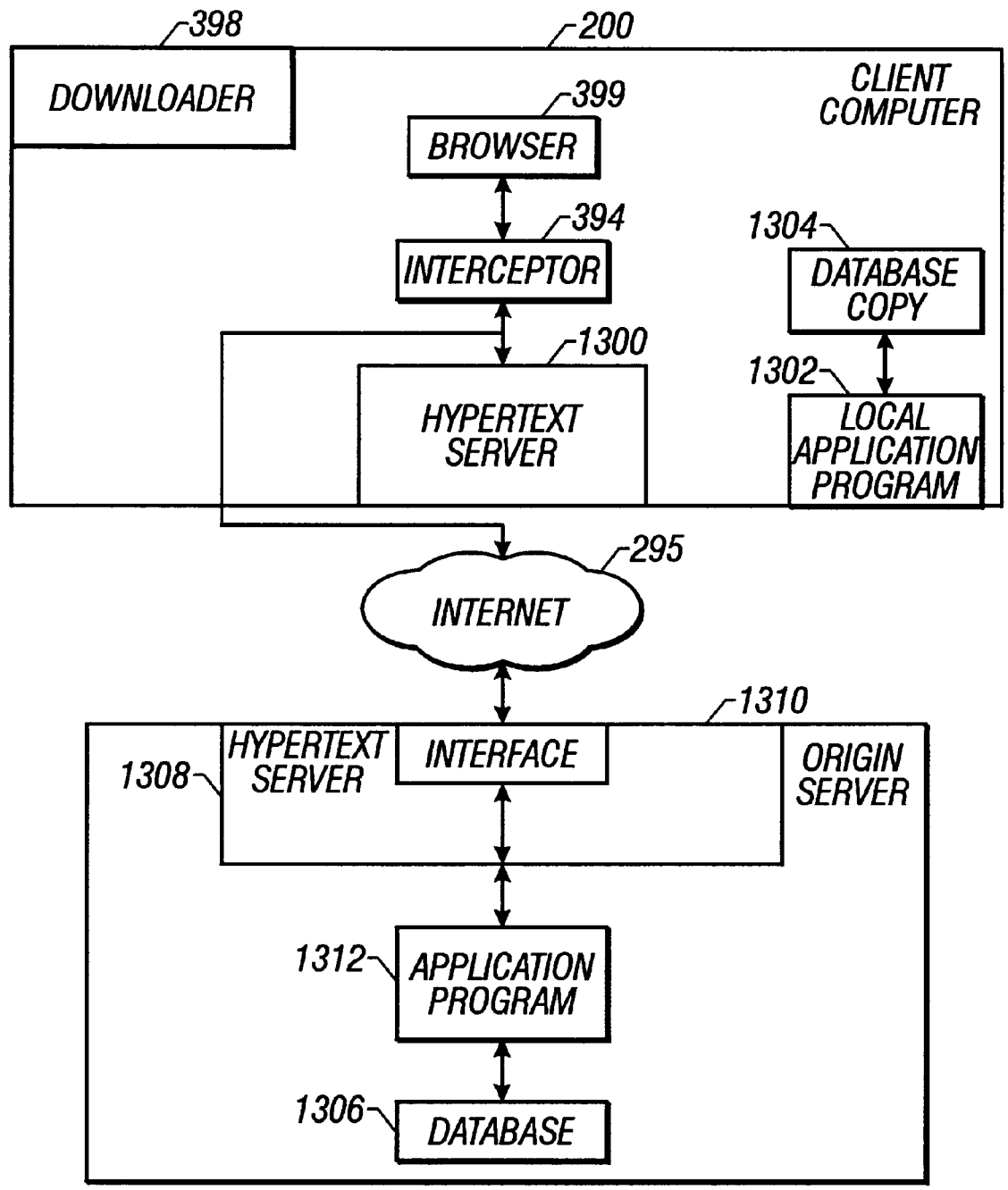
FIG. 13 is a block diagram of a network configuration that may utilize a local interface specification at a client computer.

As shown schematically in FIG. 13, another aspect of the system automatically 20 enables the client computer 300 to first download a copy 1304 of a remote network document 1306 (e.g., a database) from an origin server 1310 ("origin server 1310"), and then modify the (database) copy 1304 while disconnected from the network 395. Upon reconnect to the network 395, the client computer 300 then updates the remote (database) document 1306 to reflect the changes made by the client computer 300 during disconnect. This enables the user to modify such a database during disconnect while automatically ensuring that such modifications will be made to the remote (database) document 1306 upon re-connect.

Figure 2:
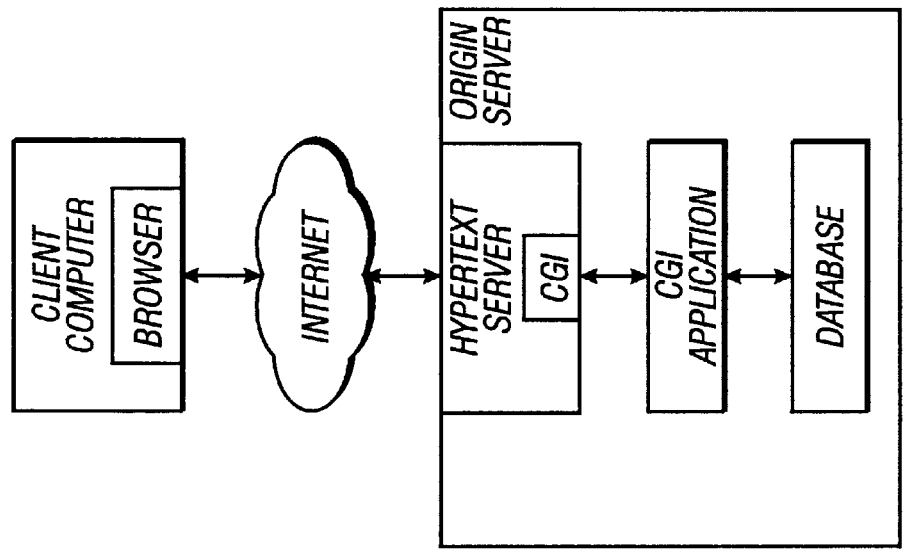
FIG. 2 is a block diagram of a prior art network configuration using a hypertext server with an interface at an origin server.

The system therefore improves on the prior art client computer 300 shown in FIG. 2. To that end, as shown in FIG. 13, the client computer 300 may include a local hypertext server 1300 for formatting data received from the interceptor 394 into a selected interface format, a local application program 1302, which is compatible with the database and receives formatted information from the hypertext server, and a downloader 398 for downloading, prior to disconnect, a local copy 1304 of the database 1306 onto the client computer 300 from the remote network device. The local application program 1302 is a substantial duplicate of the application program 1312 on the origin server 1310. In addition, program 1302 may be either downloaded with the local copy 1304, preloaded into the memory of the client computer 300, or otherwise accessible by the client computer 300 during disconnect. The interface format may be any known interface format such as, for example, Common Gateway Interface (CGI), Internet Server Application Program Interface (ISAPI, co-developed by Microsoft Corporation and Process Software Company), or JAVA Applet (developed by Sun Microsystems). CGI is discussed in more detail in "The WWW Common Gateway Interface", version 1.1, in Internet draft form, dated Feb. 16, 1996, by DRT Robinson.

Accordingly, during disconnect, requests from the browser 200 to modify the database are intercepted by the interceptor 394. Such request may include data from a template. The interceptor 394 responsively determines that the client computer 300 is disconnected from the network, and then directs the request to the local hypertext server. The local hypertext server responsively translates the request and transfers the data (from the template) to the local application program to modify the locally stored database copy. This process is done completely while disconnected from the network 395 and thus, does not require access to the hypertext server on the origin server 1310. Moreover, this process is a background process and thus, does not interrupt the execution of the browser. The modifications to the database copy 1304 then may be made to the database 1306 on the origin server 1310 upon reconnect.

Figure 14:
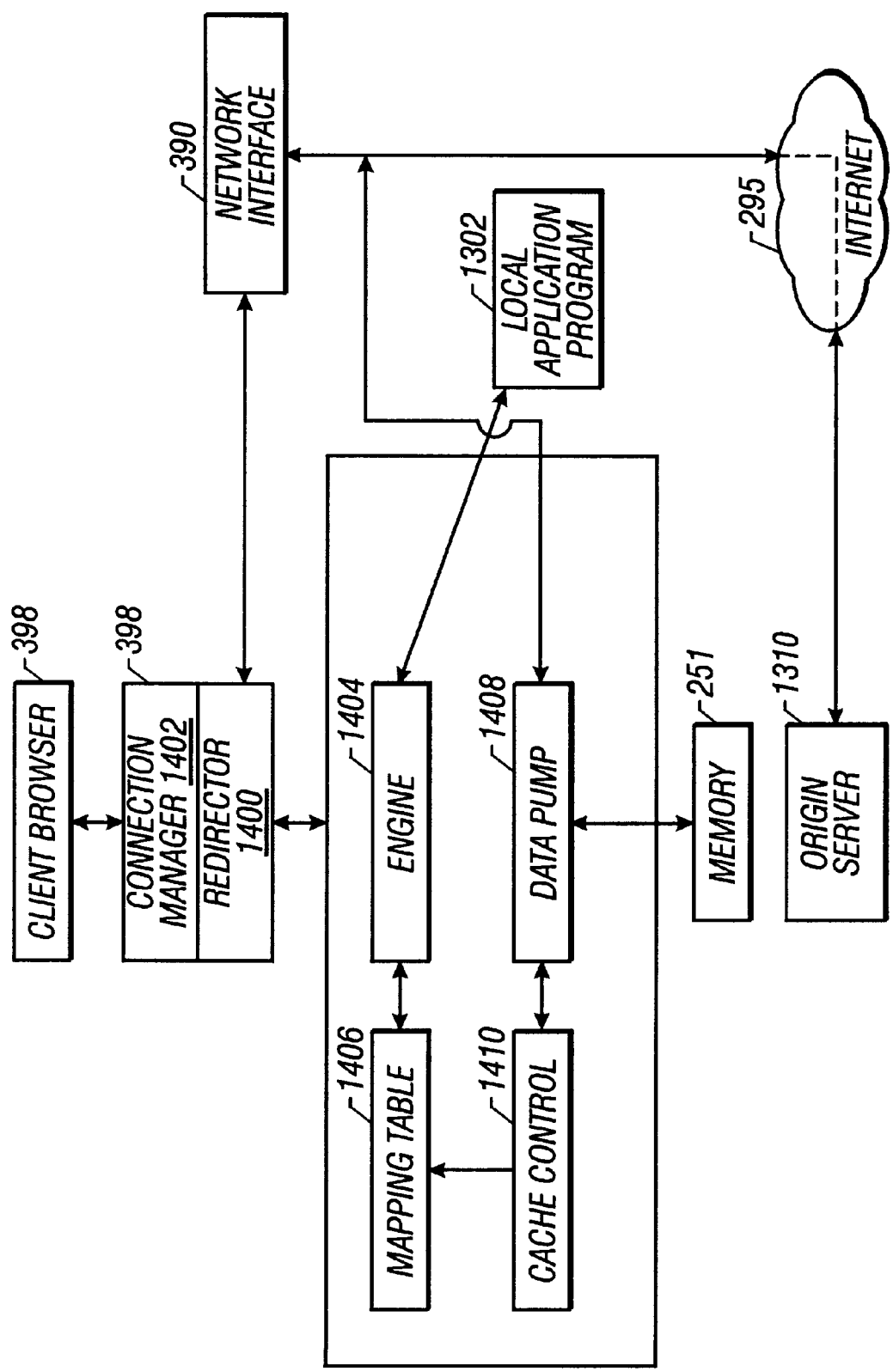
FIG. 14 is a block diagram of the local interface specification on the client computer.

More particularly, FIG. 14 is a block diagram of a preferred embodiment of the local hypertext server 1300 stored on the client computer 300 in relation to the interceptor 394. The local hypertext server 1300 may include the following elements:

an engine 1404 for performing the interfacing functions of an interface;

a directory mapping table 1406 for storing the location of the database copy 1304 within the directory structure of the client local computer;

a data pump 1408 for downloading the database 1306 from the origin server 1310; and a cache control 1410 for causing the data pump to download the database from the origin server 1310 to the client computer 300.

The interceptor may include the following elements:

a redirector 1400 for receiving browser requests and directing specified requests to the local hypertext server; and a connection manager 1402 for determining if the client computer 300 is connected to the network 395.

Figure 15:
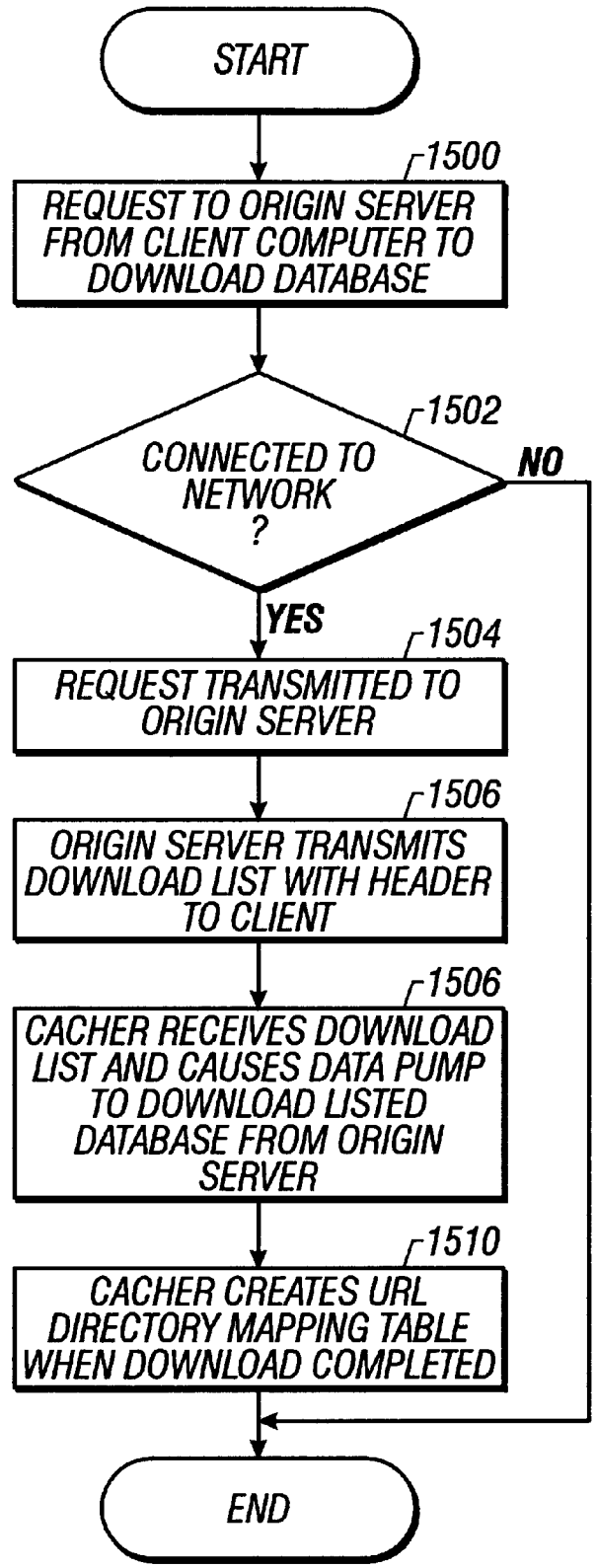
FIG. 15 is a flow chart illustrating a process for downloading a database from an origin server.
Figure 16:
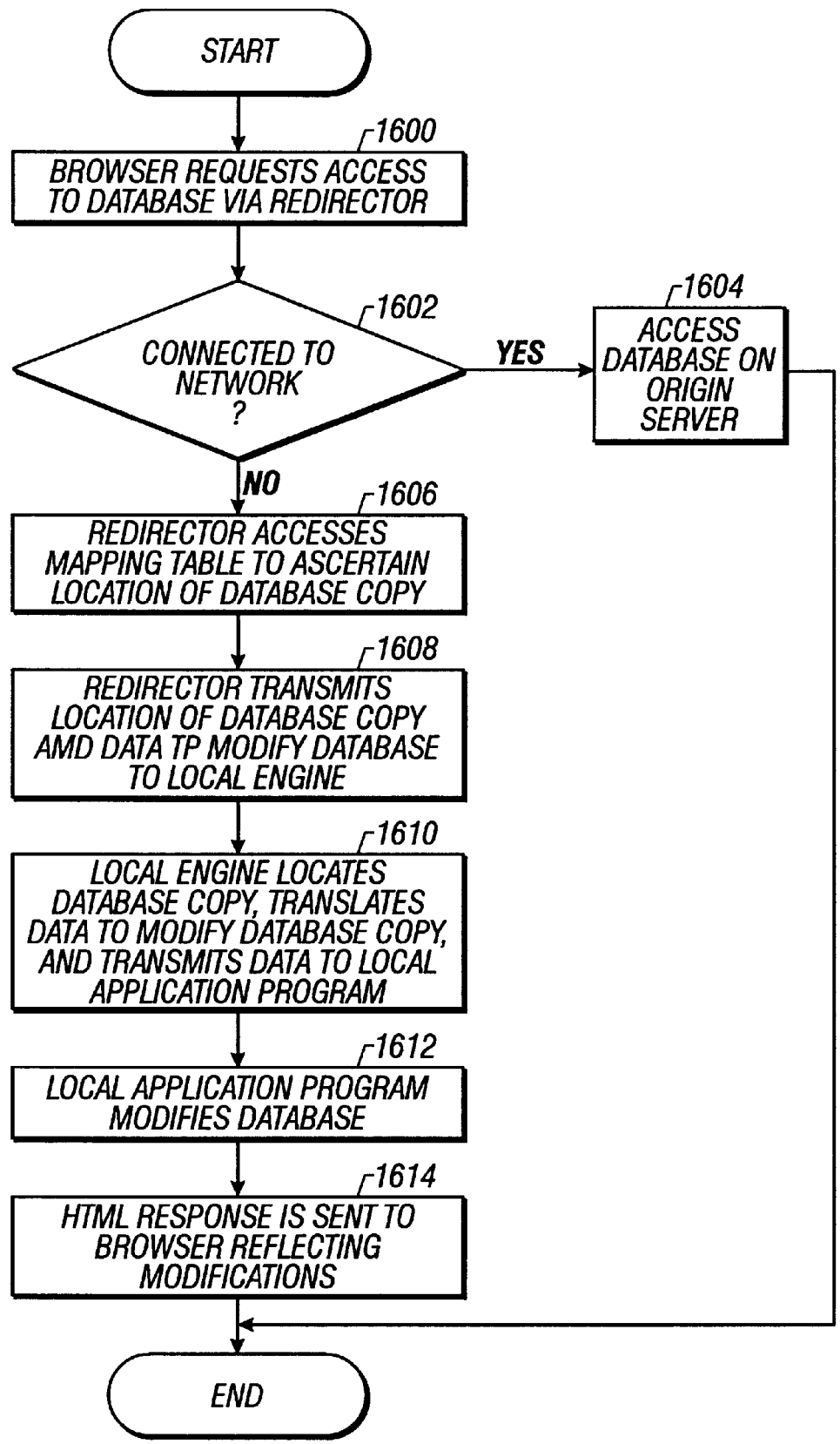
FIG. 16 is a flow chart illustrating a process for accessing and modifying a downloaded database.

The function of each of these elements are more fully understood with reference to FIGS. 15 and 16. FIG. 15 is a flow chart illustrating a process for downloading the database 1306 from the remote network device, and FIG. 16 is a flow chart illustrating a process for accessing and modifying the downloaded database copy 1304 of the database.

With reference to FIG. 15, the process begins at step 1500 in which the browser 200 on the client computer 300 requests that the database 1306 be downloaded from the origin server 1310. This request is intercepted by the interceptor 394, which determines if the client computer 300 is connected to the network. The function of the interceptor 394 is affected here by the redirector 1400 and the connection manager 1402. At step 1502, the connection manager 1402 determines if the client computer 300 is connected to the network 395. If disconnected, the process ends because the database 1306 cannot be downloaded. If connected to the network 395, the interceptor 394 transmits the request to the origin server 1310. The origin server 1310 responds at step 1506 by transmitting a list, having a "mime" header, to the client computer 300. The list then is transmitted to the cache control 1410 (step 1508) that first determines from the list which databases will be downloaded, and then causes the data pump 1408 to begin downloading a copy of each of the databases in the list. After the database copy 1304 is downloaded, the cache control 1410 creates a directory mapping table (if not already created) having fields "URL" and "location in local directory structure" (step 1510). The cache control 1410 then adds data to the directory mapping table, thereby providing the information for creating a client directory structure, if necessary, in the client computer 300 that is similar to the hierarchical tree structure on the origin server 1310. The client directory structure may be created by conventional means.

Once the database copy is downloaded into the client directory structure and its location is stored in the directory mapping table, the client may access and modify the database copy with the client browser 200 while disconnected from the network 395. FIG. 16 thus shows a process of accessing and modifying the downloaded database copy in the client computer 300 when disconnected. Specifically, after data is entered into the templates, the browser 200 first requests access to the database 1306 via the interceptor 394 and the redirector 1400 (step 1600). The redirector then queries the connection manager 1402 at step 1602 to determine if the client computer 300 is connected to the network 395. If connected to the network 395, the database 1306 on the origin server 1310 is accessed and modified, by conventional means, over the network 395 (step 1604).

If the client computer 300 is not connected to the network 395, the redirector 1400 accesses the mapping table 1406 to ascertain the location of the database and local application program in the client directory structure (step 1606). The redirector 1400 then transmits the location of the local application program 502, database copy 1304, and the data to modify the database copy 1304 to the local engine 1404 at step 1608. The local engine 1404 then locates the database copy 1306 and local application program, translates the data, and then transmits the translated data to the local application program 1302, (step 1610). The application program 1302 then modifies the database at step 1612 and responsively sends an HTML response to the browser 200 reflecting the modifications (step 1614). Upon reconnect, the data pump 1408 may upload the modified database to the origin server 1310 to reflect the changes made in the database.

In the preferred embodiment, which is implemented using CGI, the cache control 1410 accesses a plurality of functions to modify the mapping table 1406. Among those functions are:

addCGIcacheEntry(CString cURL, CString cDirectory);
removeCGIcacheEntry(CStringcURL);
mapCache(CString cURL, CString & cResult);
findCGIcacheEntry(CStringcURL);
getCGIcacheEntry(intnIndex, CString cURL, CString & cDirectory);
getCGIcacheCount( );
readCGIcacheList( ); and
writeCGIcacheList( );

Each function is briefly discussed below:

The function "add CGIcache Entry" creates a new directory entry on the client computer 300 that represents a remote (CGI) application, given the URL string and the root directory. It is assumed that the full root directory path is specified in the cDirectory parameter passed to this routine, and that cURL is the standard reference to the application on the remote server. An example of the input parameter for cURL could be "//www.server1.com/~alias/aca~1/dispatch.cgi", where www.server1.com is the remote address of the server, "/~alias/aca~1/" is a directory specification on the server and "dispatch.cgi" is the CGI application to run. An example of the input parameter for cDirectory might be "C:\WIN32APP\WGWF\", which identifies the root directory for all mapped entries. The result of this function is that an entry is created in the directory mapping table, and an associated directory is created that is used to contain files required to locally download the remote CGI application specified. The database mapping created for the above example, having a URL of:

"HTTP://www.server1.com/~alias/aca~1/dispatch.cgi" maps to the directory:

"C:\WIN32APP\WGWF\WWW.SERVER1.COM\~ALIAS\ACA~I\."

on the local system when disconnected.

The function "removeCGIcacheEntry" enables the cache control 1410 to remove a "URL to directory" mapping in the directory mapping table given cURL, where cURL is the specific URL map entry. If there is no matching URL, the request returns an error. If a URL exists in the database mapping table, it is removed.

The function "mapCache" is used by the redirector to search the directory mapping table for matching the passed cURL to an existing entry. If a match is found, the directory mapping is returned using cResult. This routine is used when the client computer 300 is disconnected to determine if the remote request can be satisfied by a stored CGI entry. If cResult returns non-zero, an entry exists and the request is directed to the engine with a SCRIPT_NAME environment parameter pointing to the local application as a result of this mapping. An example of the input parameter for the URL could be "//www.server1.com/-alias/aca-1/dispatch.cgi." If a match existed, an example of the output parameter for cResult might be "C:\WIN32APP\WGWF\WWW.SERVER1.COM\-ALIAS\ACA-1\DISPATCH.CGI." The URL has been mapped to a local directory, and the executable file DISPATCH.CGI has been parsed and appended to the directory specification.

The functions "findCGIcacheEntry," "getCGIcacheEntry" and "getCGIcacheCount" are enumeration routines used by the graphical user interface of the application to display and manage information in the directory mapping table.

The functions "readCGIcacheList" and "writeCGIcacheList" are low level routines used to read and write the basic objects used in the directory mapping table.

After the database copy is modified and the client is reconnected to the network 395, the client computer 300 may access the server again and modify the database to reflect the data added, removed, or modified during disconnect (database transaction). This may be done by conventional methods, such as by means of a reconciliation engine to update the database, or by directly overwriting the database on the origin server 1310.

When the preferred embodiment of this aspect of the system is in use, a user of the client computer 300 connects to the origin server 1310, via the network 395, and accesses a application program associated with the database. The interface associated with that application program may include a "download" button which, when selected by the client user, causes the database and associated origin server 1310 directory structure to be downloaded from the origin server 1310 to the client computer 300. A status bar may be displayed by the client computer 300 during the download. The user then may disconnect from the network 395 and modify the database copy via the local application and the browser 200 in a manner that is substantially identical (to the user) to when the client computer 300 is connected to the network. Access through the browser 200 is necessary in all CGI application programs, for example, designed for the World Wide Web because such applications frequently do not have a user interface. Specifically, the CGI application "standard in" (a part of each application program that specifies from where data may be received; for example, a keyboard or a mouse) often may be set to receive input from the hypertext server only which, in this example, receives input from the browser 200. Data to update the database copy may be entered into one or more templates displayed by the browser 200. Once the data is entered into the templates, the user may select a "submit" button, for example, that enters the data into the database copy. Upon reconnect, the modifications to the database copy are automatically made to the database on the origin server 1310. Accordingly, the database may be maintained locally while disconnected from the network 395.

It should be understood, however, that this aspect of the system may be practiced with other types of remote documents, such as word processor or spread sheet documents. Accordingly, maintenance of a database is discussed here for exemplary purposes and is not intended to limit the scope of the system. It also should be noted that although many embodiments of the system have been discussed with reference to World Wide Web pages, the system may be practiced with various other types of documents. Moreover, although CGI is disclosed as the preferred embodiment, it should be understood that the disclosed system may be utilized with any known interface format specification, such as those previously mentioned. The above discussion of CGI was exemplary only and therefore should not be considered a limitation of the interface system.

Each aspect of the system (i.e., CFHD, autoupdate, local CGI application program, image map maintenance, etc.) may be managed by conventional means. One such means is a graphical user interface listing the downloaded web pages and the aspects of the system applied to each of those web pages.

In an alternative embodiment, the system may be implemented as a computer program product for use with a computer system. Such implementation may include a series of computer instructions fixed either on a tangible medium, such as a computer readable media (e.g., diskette 342, CD-ROM 347, ROM 315, or fixed disk 352 as shown in FIG. 3) or transmittable to a computer system, via a modem or other interface device, such as communications adapter 390 connected to the network 395 over a medium 391. Medium 391 may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network 395 (e.g., the Internet or World Wide Web).

Each of the graphical user interfaces discussed above may be constructed by conventional software programming techniques known in the art. It is preferred that the GUIs be constructed by visual builders.

Although various exemplary embodiments of the invention have been disclosed, it will be apparent to those skill in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

1. A method of accessing a copy of a document in a client computer system, the document being stored in a server remote from the client computer system, the client computer system including a web browser producing browser requests for communicating with the server over the network, the method comprising the steps of:

A. intercepting a browser request to access the document;
   B. ascertaining if the client computer is connected to the network;
   C. downloading, if connected to the network, the copy from the server;
   D. determining, from the browser request, the address of the copy of the document in the client computer system when the client computer system is not connected to the network; and
   E. retrieving, when the client computer system is not connected to the network, the copy of the document in the client computer system.

2. The method of accessing a document as defined by claim 1 further including the step of:
   F. displaying the document on the client computer system.

3. The method of accessing a document as defined by claim 1 wherein the browser request includes a URL for the document, the step D of determining includes the step of:
   D1. ascertaining the location of the document in the client computer system from the URL.

4. The method of accessing a document as defined by claim 1 wherein the step of ascertaining is a background process.

5. The method of accessing a document as defined by claim 1 wherein the document includes a pointer to a second document, the method further including the step of:
   G. selecting the pointer; and
   H. locating, responsive to step G, the second document in the client computer system.

6. The method of accessing a document as defined by claim 1 wherein the client computer system includes a local hypertext server and a local application program, the method further including the steps of:
   I. executing the local application program, in response to step B of ascertaining, the local application program to produce a modified copy of the document.

7. The method of claim 1, wherein the retrieving step is only performed if the client computer system is not connected to the network.

8. An apparatus for accessing a copy of a document in a client computer system, the document being stored in a server remote from the client computer system, the client computer system including a web browser producing browser requests for communicating with the server over the network, the apparatus comprising:

means for intercepting a browser request to access the document;
   means for ascertaining if the client computer is connected to the network;
   means for downloading, if connected to the network, the copy from the server;
   means for determining, from the browser request, the address of the copy of the document in the client computer system when the client computer system is not connected to the network; and
   means for retrieving, when the client computer system is not connected to the network, the copy of the document in the client computer system.

9. The apparatus for accessing a document as defined by claim 8 further including means for displaying the document on the client computer system.

10. The apparatus for accessing a document as defined by claim 8 wherein the browser request includes a URL for the document, the determining means including:
    means for ascertaining the location of the document in the client computer system from the URL.

11. The apparatus for accessing a document as defined by claim 8 wherein the steps of ascertaining means is in the background.

12. The apparatus for accessing a document as defined by claim 8 wherein the document includes a pointer to a second document, the apparatus further including:
    means for selecting the pointer; and
    means for locating, responsive to the selecting means, the second document in the client computer system.

13. The apparatus for accessing a document as defined by claim 8 wherein the client computer system includes a local hypertext server and a local application program, the apparatus further including:

means for executing the local application program, in response to the ascertaining means, the local application program producing a modified copy of the document.

14. A computer program product comprising:

a computer usable medium having computer readable program code thereon for accessing a copy of a document in a client computer system, the document being stored in a server remote from the client computer system, the client computer system including a web browser producing browser requests for communicating with the server over the network, the computer readable program code comprising:

program code for intercepting a browser request to access the document;

program code for ascertaining if the client computer is connected to the network;

program code for downloading, if connected to the network, the copy from the server;

program code for determining, from the browser request, the address of the copy of the document in the client computer system when the client computer system is not connected to the network; and program code for retrieving, when the client computer system is not connected to the network, the copy of the document in the client computer system.

15. The computer program product as defined by claim 14 further including program code for displaying the document on the client computer system.

16. The computer program product as defined by claim 14 wherein the browser request includes a URL for the document, the program code for determining includes:

program code for ascertaining the location of the document in the client computer system from the URL.

17. The computer program product as defined by claim 14 wherein the program code for ascertaining utilizes a background process.

18. The computer program product as defined by claim 14 wherein the document includes a pointer to a second document, the computer program product further including:

program code for selecting the pointer; and program code for locating, responsive to the program code for selecting the pointer, the second document in the client computer system.

19. The computer program product as defined by claim 14 wherein the client computer system includes a local hypertext server and a local application program, the computer program product further including:

program code for executing the local application program, in response to the program code for ascertaining, the local application program producing a modified copy of the document.

20. A method of accessing a document on a remote network device from a client computer system, the client computer system having a web browser and a memory, the client computer system being connectable to the remote network device by a network, the method comprising the steps of:

A. intercepting a browser request from the web browser to access the document on the remote network device;

B. ascertaining if the client is connected to the network;

C. determining from the browser request, when the client is connected to the network, the remote address of the document on the remote network device;

D. downloading a local copy of the document into the memory of the client computer system;

E. identifying a plurality of documents referenced by the downloaded document by reviewing the downloaded document for a number of pointers embedded therein that identify the documents; and F. downloading the documents from nodes on the remote network device, the nodes being in a hierarchical tree structure with a plurality of levels, the document being on one of the nodes.

21. The method of accessing a document as defined by claim 20 further including the step of:

G. displaying the local copy on the client computer.

22. The method of accessing a document as defined by claim 20, wherein step F of downloading includes the steps of:

F1. designating the node having the document as the root node;

F2. designating a deepest node level of the tree structure, the deepest node level being the same as or below the level of the root node; and F3. downloading, into the memory of the client computer system, documents in the nodes on levels that are between the root node and the node at the deepest node level.

23. The method of accessing a document as defined by claim 20 wherein the pointers referencing an image map file having a graphical image, each pointer having an associated document address.

24. The method of accessing a document as defined by claim 23 further including the steps of:

E. dividing the graphical image into a predetermined number of sections;

F. locating at least one of the pointers on the graphical image, each located pointer being associated with at least one of the sections; and G. associating the document address of each located pointer with the section associated with each located pointer.

25. The method of accessing a document as defined by claim 20 wherein the network includes an update network device, the method further including the steps of:

H. downloading an update copy of the document into the memory of the update network device;

I. causing the update network device to interface with the remote network device;

J. comparing the document to the update copy; and

K. modifying, responsive to the step J of comparing, the update copy.

26. An apparatus for accessing a document on a remote network device from a client computer system, the client computer system having a web browser and a memory, the client computer system being connectable to the remote network device by a network, the apparatus comprising:

means for intercepting a browser request from the web browser to access the document on the remote network device;

means for ascertaining if the client is connected to the network;

means for determining from the browser request, responsive to the ascertaining means, the remote address of the document on the remote network device;

means for downloading a local copy of the document into the memory of the client computer system;

means for identifying a plurality of documents referenced by the downloaded document by reviewing the downloaded document for a number of pointers embedded therein that identify the documents; and means for downloading the documents from nodes on the remote network device, the nodes being in a hierarchical tree structure with a plurality of levels, the document being on one of the nodes.

27. The apparatus for accessing a document as defined by claim 26 further including:

means for displaying the local copy on the client computer.

28. The apparatus for accessing a document as defined by claim 26 wherein the means for downloading includes:

means for designating the node having the document as the root node;

means for designating a deepest node level of the tree structure, the deepest node level being the same as or below the level of the root node; and means for downloading, into the memory of the client computer system, documents in the nodes on levels that are between the root node and the node at the deepest node level.

29. The apparatus for accessing a document as defined by claim 25 wherein the pointers referencing an image map file having a graphical image, each pointer having an associated document address.

30. The apparatus for accessing a document as defined by claim 29 further including:

means for dividing the graphical image into a predetermined number of sections;

means for locating at least one of the plurality of pointers on the graphical image, each located pointer being associated with at least one of the sections; and means for associating the document address of each located pointer with the section associated with each located pointer.

31. The apparatus for accessing a document as defined by claim 25 wherein the network includes an update network device, the apparatus further including:

means for downloading an update copy of the document into the memory of the update network device;

means for causing the update network device to interface with the remote network device;

means for comparing the document to the update copy; and means, responsive to the comparing means, for modifying the update copy.

32. A computer program product for use with a local computer system, the computer program product accessing a document on a remote network device from a client computer system, the client computer system having a web browser and a memory, the client computer system being connectable to the remote network device by a network, the computer program product comprising a computer usable medium having computer readable program code thereon, the computer readable program code including:

program code for intercepting a browser request from the web browser to access the document on the remote network device;

program code for ascertaining if the client is connected to the network;

program code for determining from the browser request, responsive to the program code for ascertaining, the remote address of the document on the remote network device;

program code for downloading a local copy of the document into the memory of the client computer system;

program code for identifying a plurality of documents referenced by the downloaded document by reviewing the downloaded document for a number of pointers embedded therein that identify the documents; and program code for downloading the documents from nodes on the remote network device, the nodes being in a hierarchical tree structure with a plurality of levels, the document being on one of the nodes.

33. The computer program product as defined by claim 32 further including:

program code for displaying the local copy on the client computer.

34. The computer program product as defined by claim 32, wherein the program code for downloading includes:

program code for designating the node having the document as the root node;

program code for designating a deepest node level of the tree structure, the deepest node level being the same as or below the level of the root node; and program code for downloading, into the memory of the local computer system, documents in the nodes on levels that are between the root node and the node at the deepest node level.

35. The computer program product as defined by claim 32 wherein the pointers referencing an image map file having a graphical image, each pointer having an associated document address.

36. The computer program product as defined by claim 35 further including:

program code for dividing the graphical image into a predetermined number of sections;

program code for locating at least one of the plurality of pointers on the graphical image, each located pointer being associated with at least one of the sections; and program code for associating the document address of each located pointer with the section associated with each located pointer.

37. The computer program product as defined by claim 32 wherein the network includes an update network device, the computer program product further including:

program code for downloading an update copy of the document into the memory of the update network device;

program code for causing the update network device to interface with the remote network device;

program code for comparing the document to the update copy; and program code for modifying, responsive to the program code of comparing, the update copy.

38. A method for a client computer system accessing documents stored on a remote server, the client computer system including a web browser producing browser requests for communicating with the server over a network, the method comprising the steps of:

A. a user of the client computer system submitting a first browser request over the network for a copy of a first document;

B. intercepting the first browser request and, in response thereto, performing steps comprising (1) downloading a copy of the first document from the server to the client computer system, and (2) determining from the downloaded copy of the first document whether the first document includes a pointer to a second document and, if so, using the pointer to determine the address of the second document, and using the second document address in downloading a copy of the second document from the server to the client computer system; and C. storing the copies of the first and second documents in the client computer system.

39. The method in accordance with claim 38, further including the steps of:

A. a user of the client computer system submitting a second browser request over the network for a copy of at least one of said first and second documents; and B. intercepting the second browser request and, in response thereto, obtaining a copy of the at least one document from one of the server and the client computer system.

40. The method in accordance with claim 39, further including the steps of:

A. ascertaining if the client computer is connected to the network; and

B. if the client computer system is connected to the network, downloading a copy of the at least one document from the network.

41. The method as defined by claim 38, wherein the second browser request contains a request for a copy of the first document, and the method further includes the step of locating the second document in the client computer system responsive to the pointer in the first document.

42. The method as defined by claim 38, wherein the second browser request contains a request for a copy of the second document.

43. An apparatus for accessing a plurality of documents by a client computer system, the documents being stored in a server remote from the client computer system, the client computer system including a web browser producing browser requests for communicating with the server over a network, the apparatus comprising:

A. means, responsive to a user, for submitting a first browser request over the network for a copy of a first document;

B. an interceptor for intercepting the first browser request, said interceptor including (1) means for downloading a copy of the first document from the server to the client computer system, and (2) means for determining from the downloaded copy of the first document whether the first document includes a pointer to a second document and, if so, using the pointer to determine the address of the second document, and using the second document address in downloading a copy of the second document from the server to the client computer system; and C. means for storing the copies of the first and second documents in the client computer system.

44. The apparatus in accordance with claim 43, further including:

A. means responsive to a user of the client computer system, for submitting a second browser request over the network for a copy of at least one of said first and second documents; and B. means for intercepting the second browser request and, in response thereto, obtaining a copy of the at least one document from one of the server and the client computer system.

45. The apparatus in accordance with claim 44, further including:

A. means for ascertaining if the client computer is connected to the network; and B. means responsive to the ascertaining means for downloading, if the client computer system is connected to the network, a copy of the at least one document from the network.

46. The method as defined by claim 43, wherein the second browser request contains a request for a copy of the first document, and the apparatus further includes means for locating the second document in the client computer system responsive to the pointer in the first document.

47. The method as defined by claim 43, wherein the second browser request contains a request for a copy of the second document.

48. A computer program product for accessing a plurality of documents by a client computer system, the documents being stored in a server remote from the client computer system, the client computer system including a web browser producing browser requests for communicating with the server over a network, the product comprising a computer usable medium and computer readable program code stored on the computer usable medium, said program code including:

A. program code for submitting, responsive to a user, a first browser request over the network for a copy of a first document;

B. program code for intercepting the first browser request, the intercepting program code including (1) code for downloading a copy of the first document from the server to the client computer system, and (2) code for determining from the downloaded copy of the first document whether the first document includes a pointer to a second document and, if so, using the pointer to determine the address of the second document, and using the second document address in downloading a copy of the second document from the server to the client computer system; and C. program code for storing the copies of the first and second documents in the client computer system.

49. The computer program product in accordance with claim 48, wherein the program code further comprises:

A. program code responsive to a user of the client computer system, for submitting a second browser request over the network for a copy of at least one of said first and second documents; and B. program code for intercepting the second browser request and, in response thereto, obtaining a copy of the at least one document from one of the server and the client computer system.

50. The computer program product in accordance with claim 48, wherein the program code further comprises:

A. program code for ascertaining if the client computer is connected to the network; and B. program code, responsive to the ascertaining program code, for downloading, if the client computer system is connected to the network, a copy of the at least one document from the network.

51. The computer program product in accordance with claim 48, wherein the second browser request contains a request for a copy of the first document, and wherein the program code further comprises program code for locating the second document in the client computer system responsive to the pointer in the first document.

52. The computer program product in accordance with claim 48, wherein the second browser request contains a request for a copy of the second document.

* * * * *